(12) United States Patent
Baur et al.

(10) Patent No.: US 8,882,416 B2
(45) Date of Patent: Nov. 11, 2014

(54) CONNECTING MEANS AND METHOD OF PRODUCING A CONNECTION BETWEEN A FIRST COMPONENT AND A SECOND COMPONENT

(75) Inventors: Franz Baur, Oberstaufen (DE); Franz Haser, Oberstaufen (DE); Wilfried Schneider, Bubendorf (CH); Patrick Jeker, Brislach (CH)

(73) Assignees: Franz Baur, Oberstaufen (DE); Franz Haser, Oberstaufen (DE); Lamello AG, Bubendorf (CH)

( * ) Notice: Subject to any disclaimer, the term of this patent is extended or adjusted under 35 U.S.C. 154(b) by 67 days.

(21) Appl. No.: 13/544,769

(22) Filed: Jul. 9, 2012

(65) Prior Publication Data

US 2012/0328386 A1 Dec. 27, 2012

Related U.S. Application Data

(60) Division of application No. 12/611,748, filed on Nov. 3, 2009, now Pat. No. 8,240,942, which is a continuation of application No. PCT/EP2008/003575, filed on May 3, 2008.

(30) Foreign Application Priority Data

May 8, 2007 (EP) .................... 07009267

(51) Int. Cl.
*B23C 1/20* (2006.01)
*B23C 3/34* (2006.01)
(Continued)

(52) U.S. Cl.
CPC ... *B23C 3/30* (2013.01); *B23C 5/08* (2013.01); *A47B 2230/0077* (2013.01); *A47B 87/002*
(Continued)

(58) Field of Classification Search
USPC ......... 409/143, 175, 177, 178, 179, 181, 190, 409/191, 199; 144/74, 80, 81, 82, 90.1, 91, 144/91.2, 135.4, 136.1, 144.1, 144.41, 144/144.51, 144.52, 371, 372
IPC .................... B23C 1/20,3/28, 3/34; B23D 5/02, B23D 13/02, 13/06
See application file for complete search history.

(56) References Cited

U.S. PATENT DOCUMENTS 1,428,308 A 9/1922 Wiard
4,641,988 A 2/1987 Ganner
(Continued)

FOREIGN PATENT DOCUMENTS

CN 1406712 4/2003
DE 1803365 6/1969
(Continued)

OTHER PUBLICATIONS

Chinese State Intellectual Property Office, "First Office Action," issued in connection with Chinese Application No. 201110139063.1, and it's English translation, mailed on Dec. 5, 2012, 8 pages.
(Continued)

*Primary Examiner* — Andrea Wellington
*Assistant Examiner* — Michael Vitale
(74) *Attorney, Agent, or Firm* — Hanley, Flight & Zimmerman, LLC.

(57) ABSTRACT

This application is directed to groove milling devices for milling a groove in a component. In one example, a groove milling device includes a milling disk which is rotatable about a rotational axis, wherein the groove milling device comprises a displacement device for moving the milling disk along the rotational axis during the milling process. In an example, the groove milling device may include a control device which actuates the displacement device automatically when a predetermined depth of the milled groove is reached during the milling process. In an example, the groove milling device may include a switch for activating the displacement device by an operator during the milling process. In an example, the energy required for actuating the displacement device may be generated by a generator coupled to a main drive spindle of the groove milling device.

11 Claims, 27 Drawing Sheets

(51) Int. Cl.

| | | |
|---|---|---|
| *B23C 3/30* | (2006.01) | |
| *B23C 5/08* | (2006.01) | |
| *F16B 12/20* | (2006.01) | |
| *B27F 5/02* | (2006.01) | |
| *B23C 5/10* | (2006.01) | |
| *A47B 87/00* | (2006.01) | |

(52) U.S. Cl.
CPC ..... (2013.01); *F16B 12/2036* (2013.01); *B27F 5/023* (2013.01); *B23C 5/1054* (2013.01)
USPC ........ 409/143; 409/175; 409/181; 144/136.1; 144/371

(56) References Cited

U.S. PATENT DOCUMENTS

| | | | |
|---|---|---|---|
| 4,913,204 A * | 4/1990 | Moores et al. ............ 144/136.95 |
| 4,926,916 A * | 5/1990 | Legler et al. ................ 144/136.9 |
| 5,257,654 A * | 11/1993 | Bean et al. ................ 144/136.95 |
| 5,288,271 A | 2/1994 | Nelson et al. |
| 5,529,428 A | 6/1996 | Bischof |
| 5,590,988 A * | 1/1997 | Rusconi ........................ 409/182 |
| 5,881,784 A * | 3/1999 | Morikawa et al. ....... 144/136.95 |
| 6,014,849 A | 1/2000 | Yonemura |
| 6,021,826 A * | 2/2000 | Daniell ............................ 144/73 |
| 6,260,591 B1 * | 7/2001 | George et al. ............ 144/136.95 |
| 6,499,907 B1 | 12/2002 | Baur |
| 6,926,463 B2 | 8/2005 | Shaw et al. |
| D573,454 S | 7/2008 | Eberle, III |
| 7,441,985 B2 | 10/2008 | Kelly et al. |
| 7,578,105 B2 | 8/2009 | Eberle, III |
| 7,908,812 B2 | 3/2011 | Eberle, III |
| 2003/0050160 A1 | 3/2003 | Popp et al. |
| 2010/0111599 A1 | 5/2010 | Baur et al. |

FOREIGN PATENT DOCUMENTS

| | | | |
|---|---|---|---|
| DE | 29602020 U1 | 4/1996 | |
| DE | 19604243 | 8/1997 | |
| DE | 19809897 A1 * | 8/1999 | ............... B23C 3/34 |
| DE | 19807663 | 9/1999 | |
| EP | 1206991 | 5/2002 | |
| EP | 1291122 | 3/2003 | |
| FR | 2172552 | 9/1973 | |
| GB | 992639 | 5/1965 | |
| GB | 1239260 | 7/1971 | |
| GB | 1348616 | 3/1974 | |
| JP | 10-263911 A | 10/1998 | |

OTHER PUBLICATIONS

European Patent Office, "European Exam Report," issued in connection with European Patent Application No. 08749312.8, dated Apr. 3, 2012, 13 pages.
International Searching Authority, "International Search Report," issued in connection with International Application No. PCT/EP2008/003575, dated Feb. 5, 2009, 8 pages.
European Patent Office, "Office Action," issued in connection with European Application No. 07 009 267.1, mailed on May 22, 2012, 11 pages.
United States Patent and Trademark Office, "Notice of Allowance," issued in connection with U.S. Appl. No. 12/611,748, mailed on Apr. 3, 2012, 19 pages.
United States Patent and Trademark Office, "Non-Final Office Action," issued in connection with U.S. Appl. No. 12/611,748, mailed on Aug. 29, 2011, 16 pages.
United States Patent and Trademark Office, "Restriction Requirement," issued in connection with U.S. Appl. No. 12/611,748, mailed on Jun. 29, 2011, 7 pages.
European Patent Office, "European Search Report," issued in connection with European Patent Application Publication No. EP 1 989 956 A3, dated Feb. 5, 2009, 5 pages.

* cited by examiner

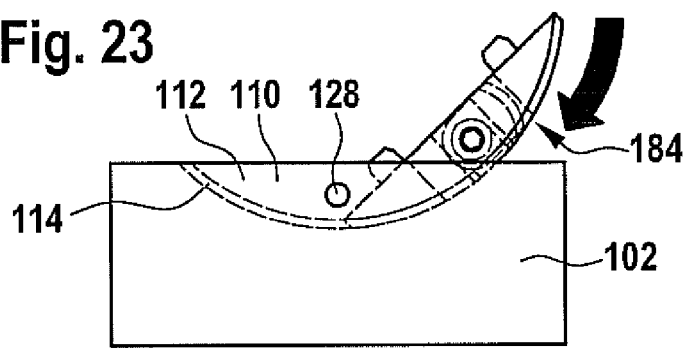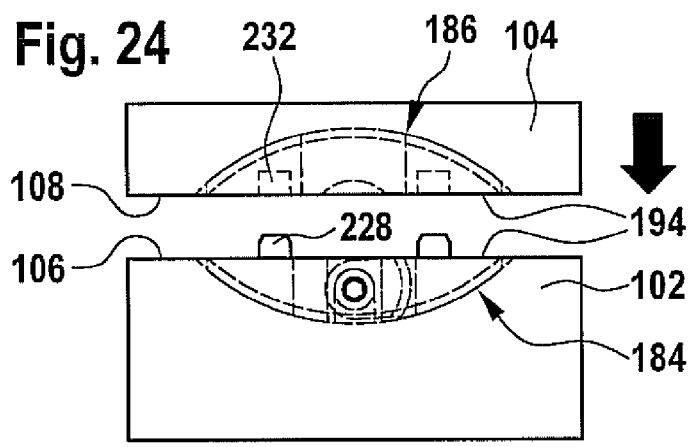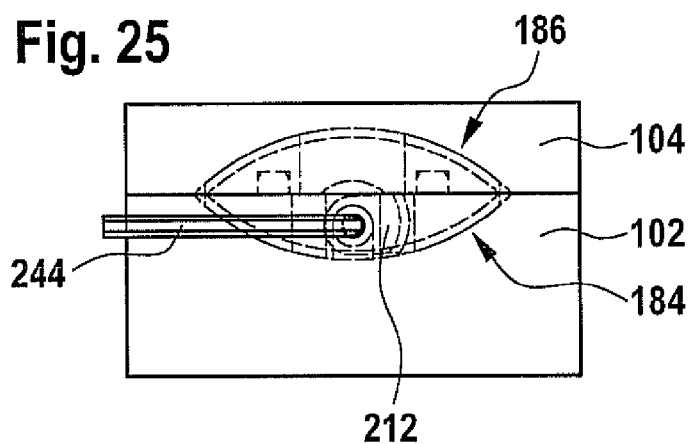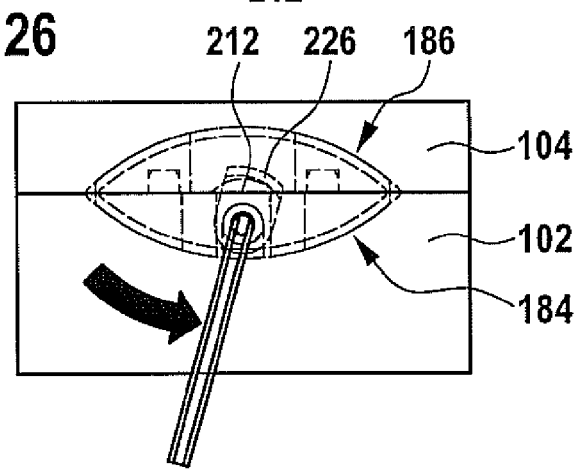

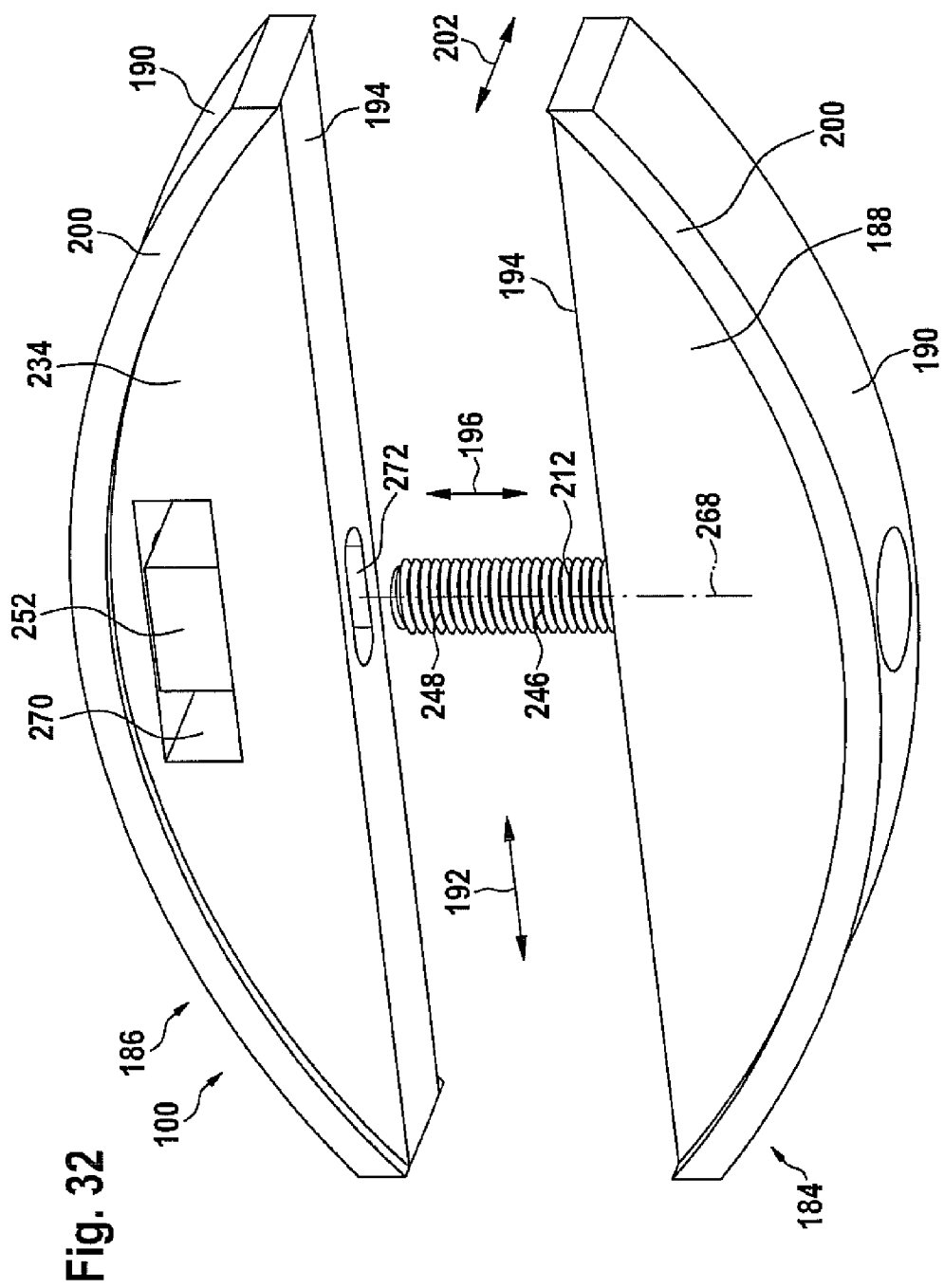

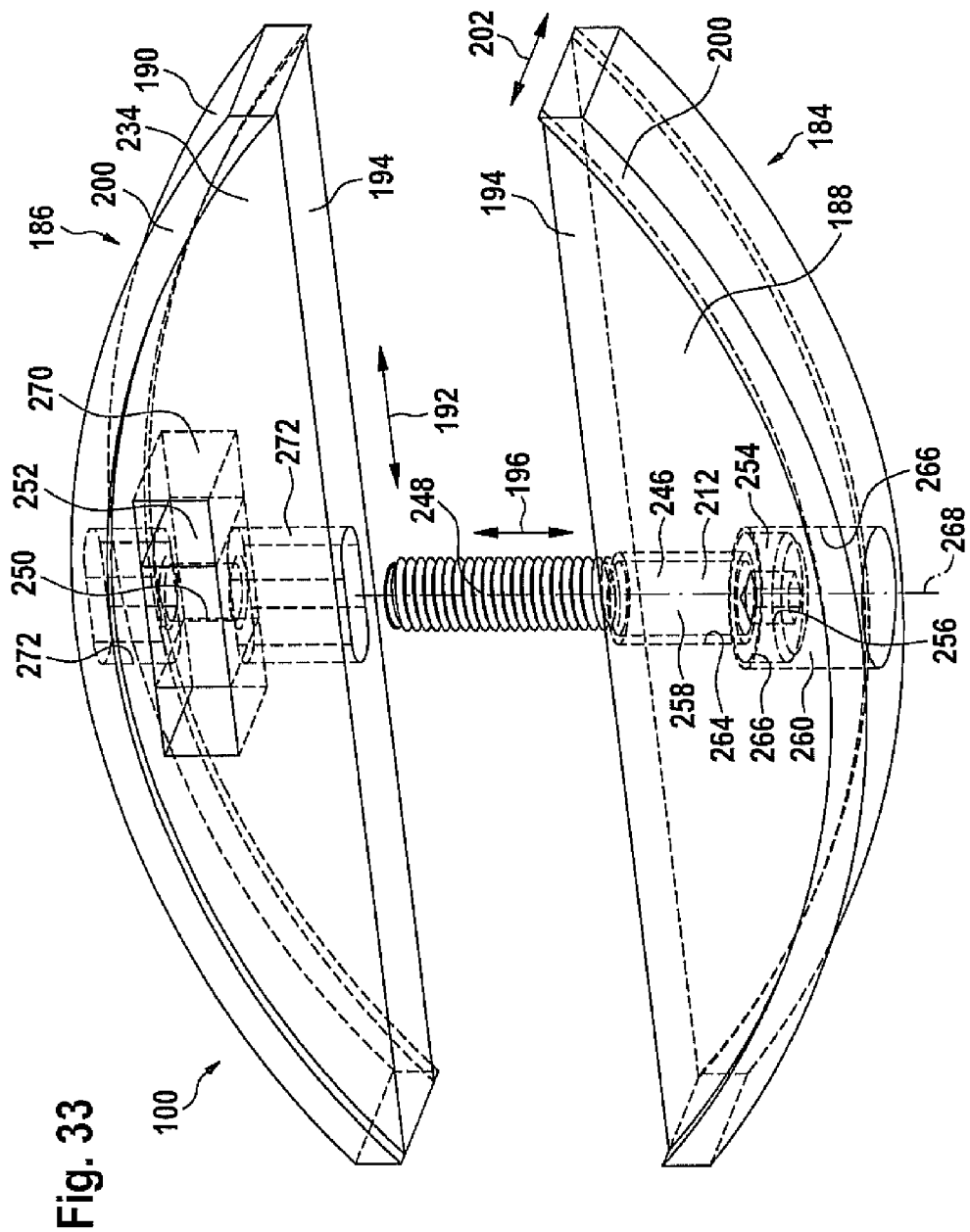

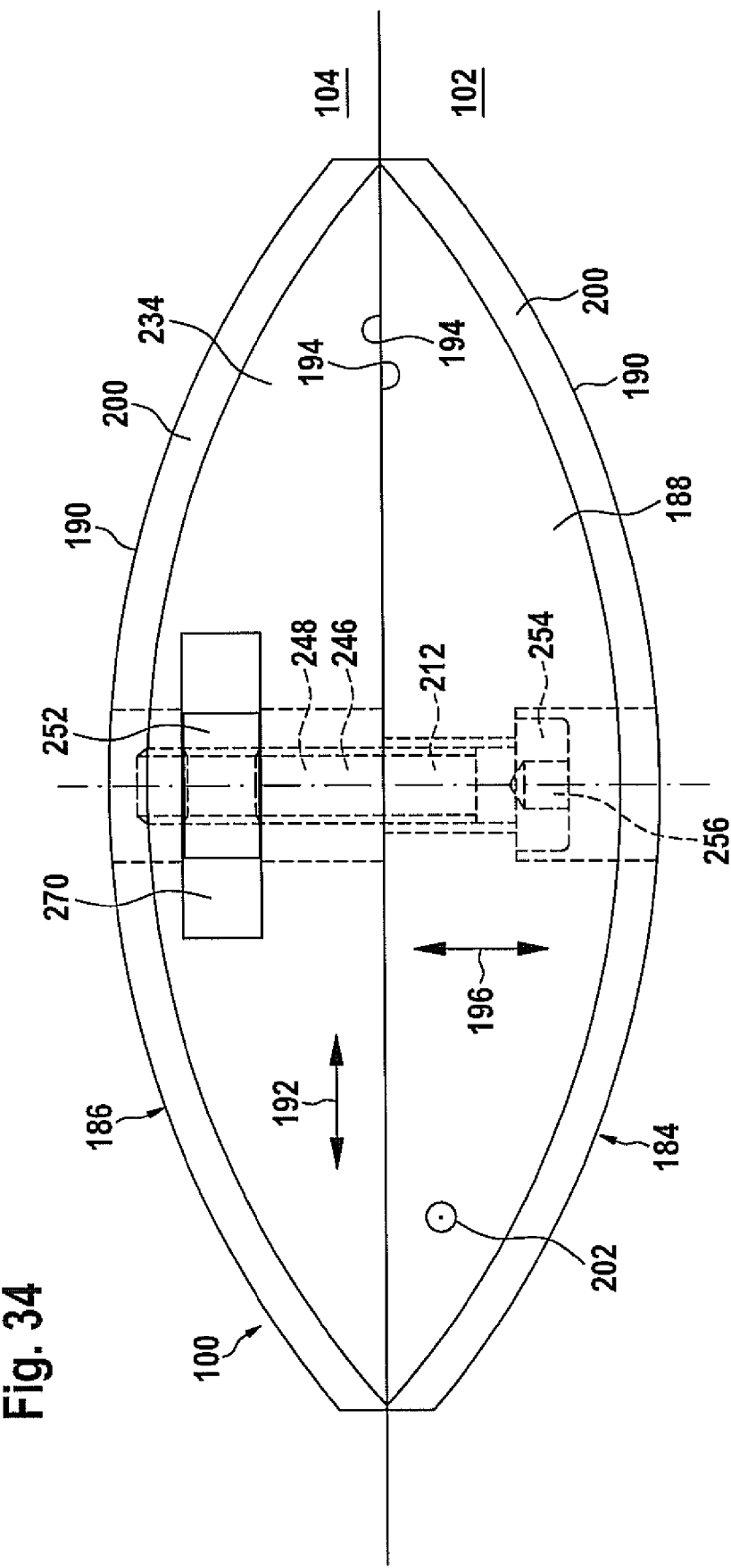

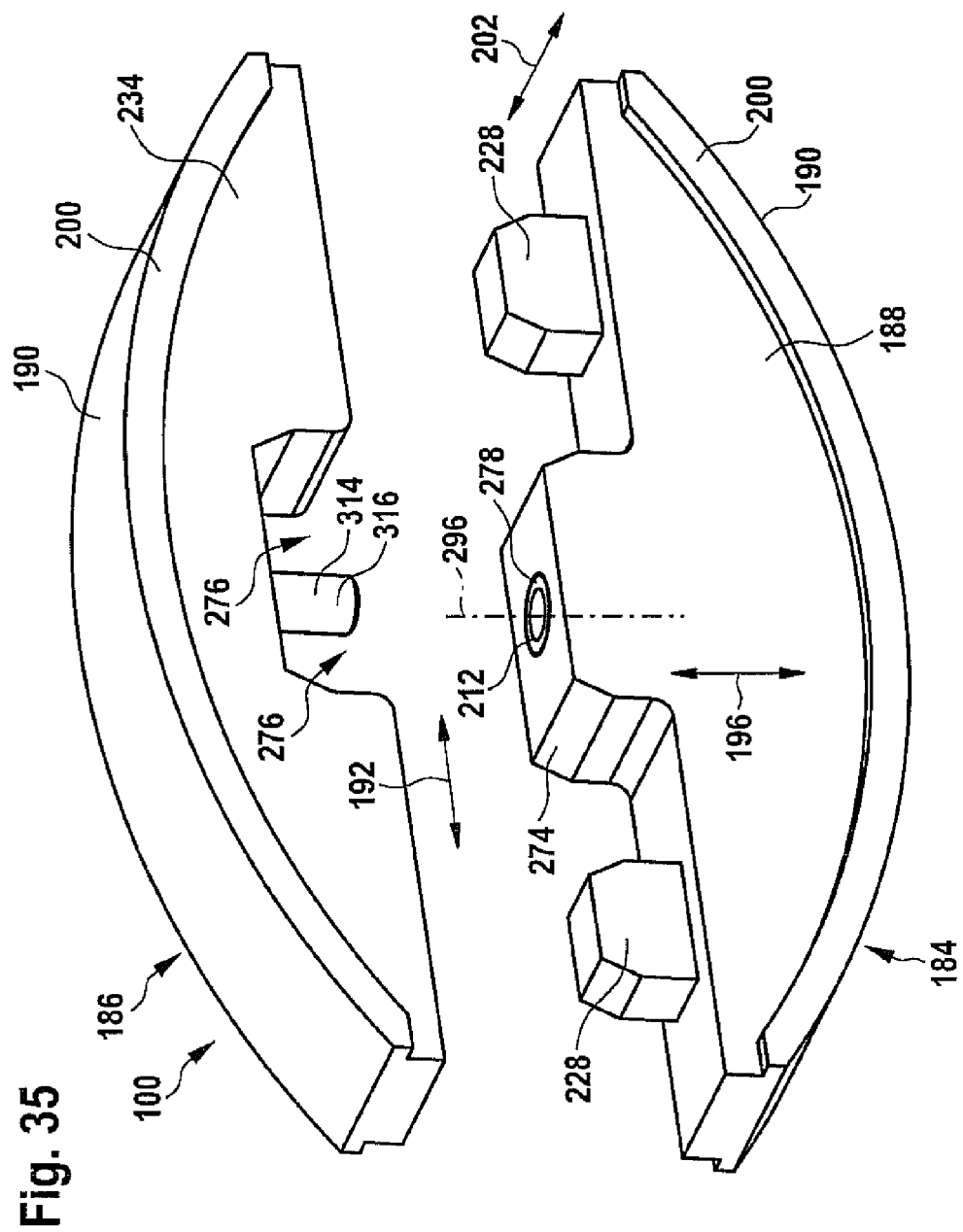

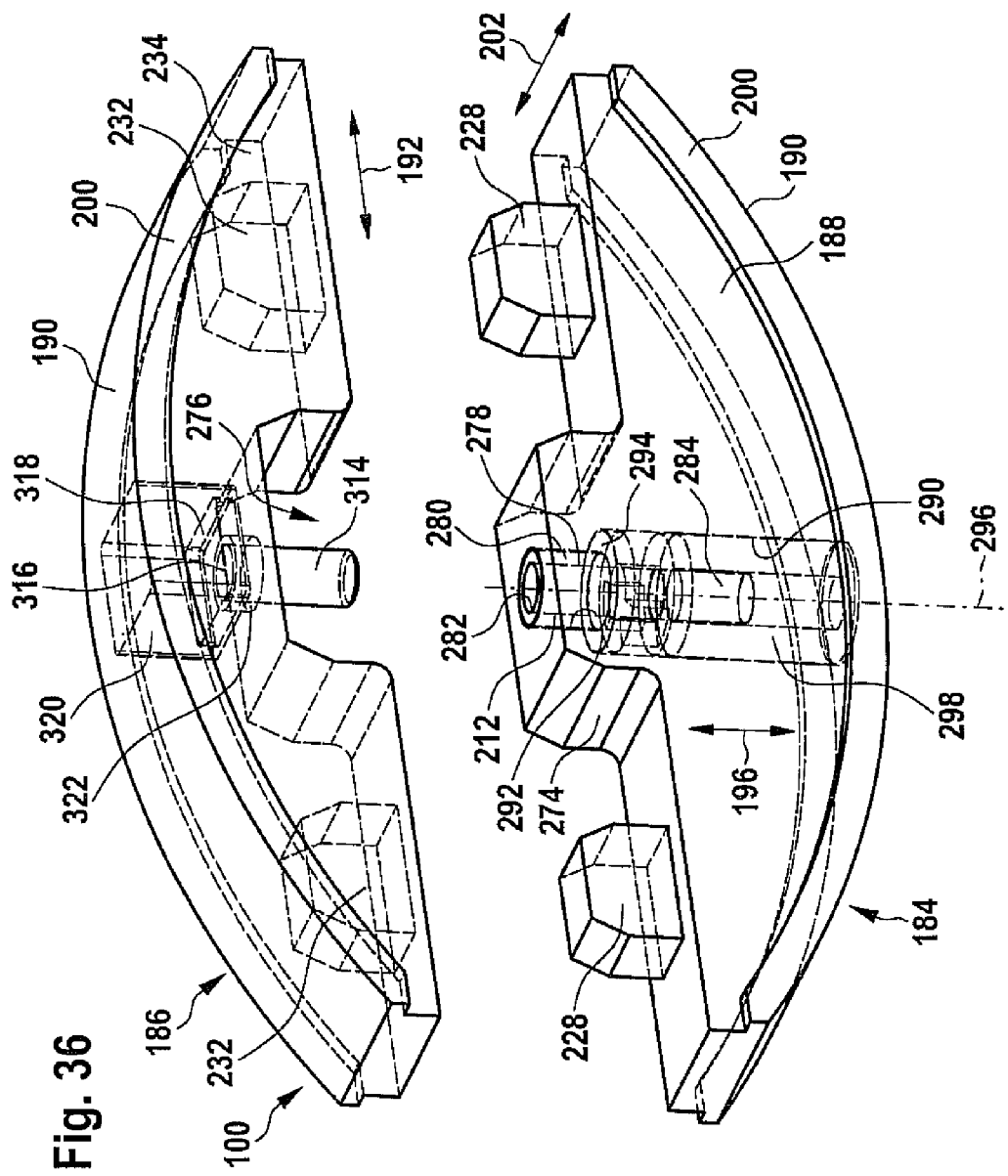

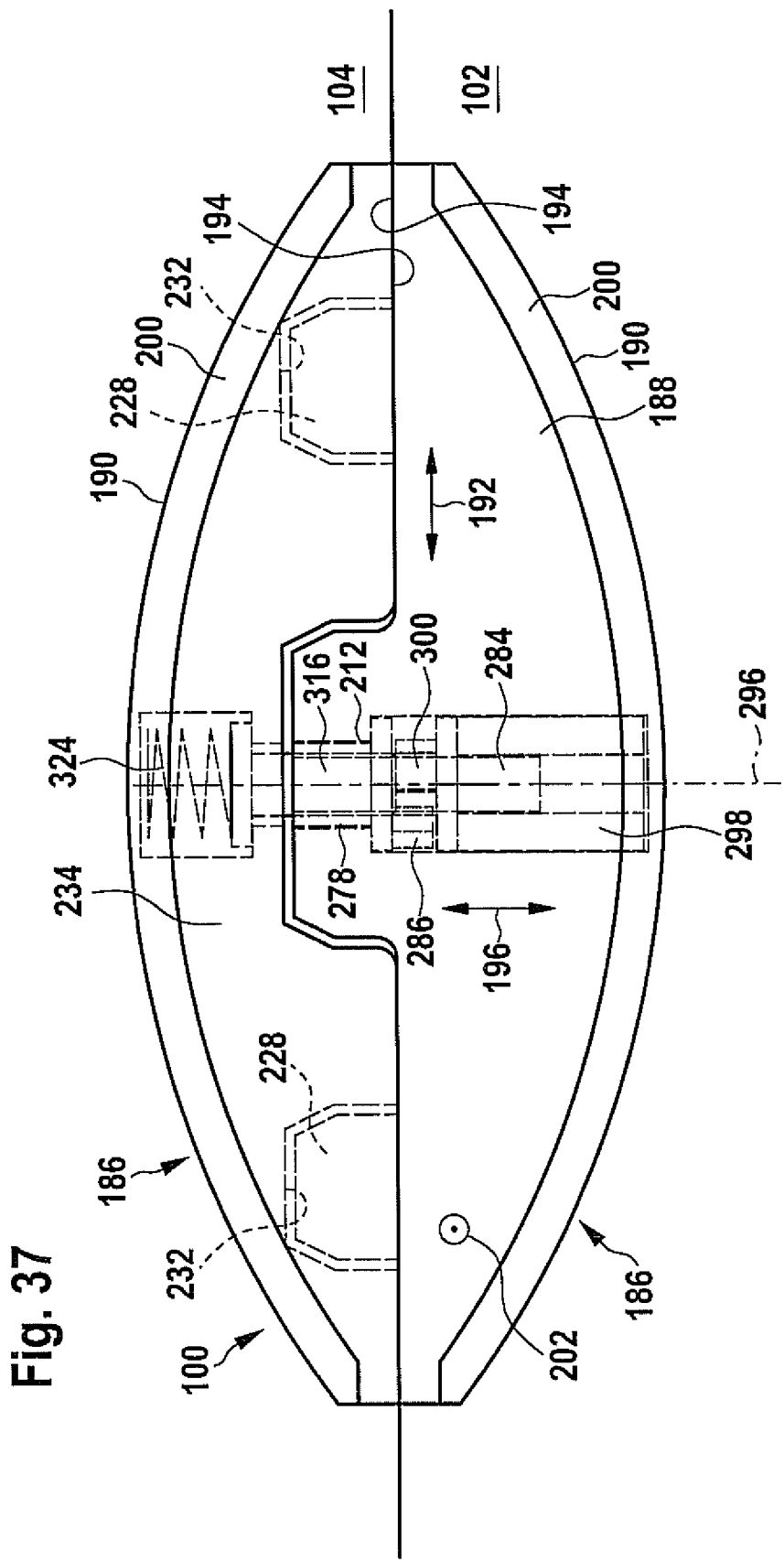

Fig. 38
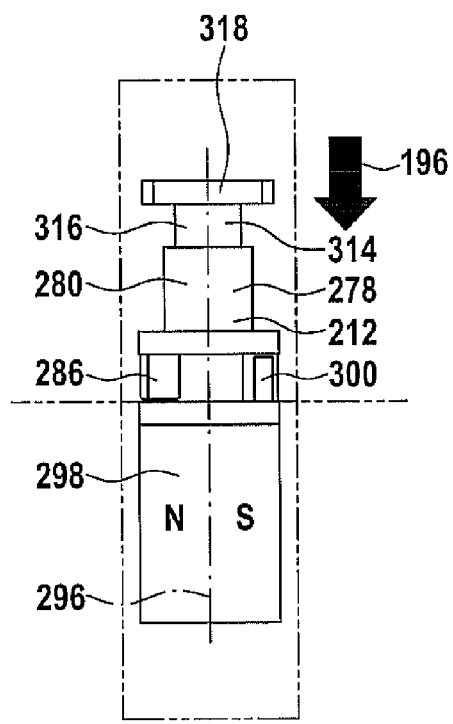
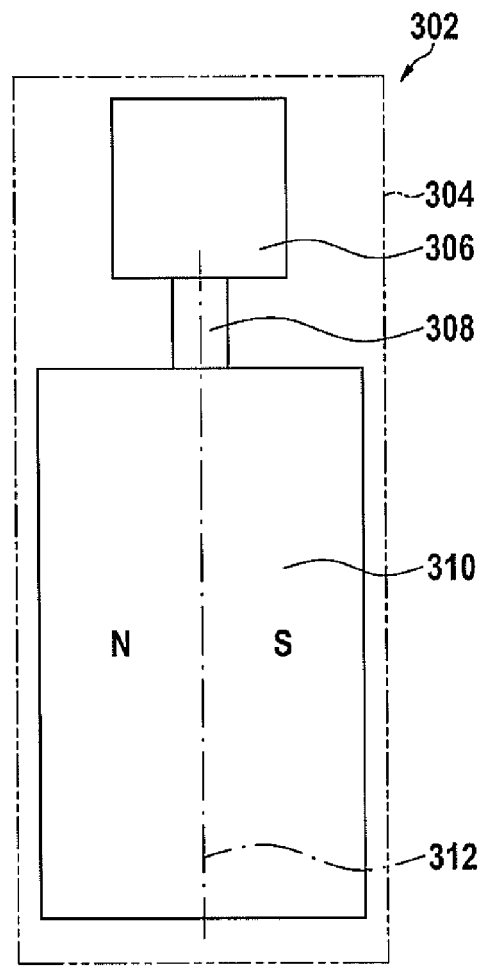
Fig. 39
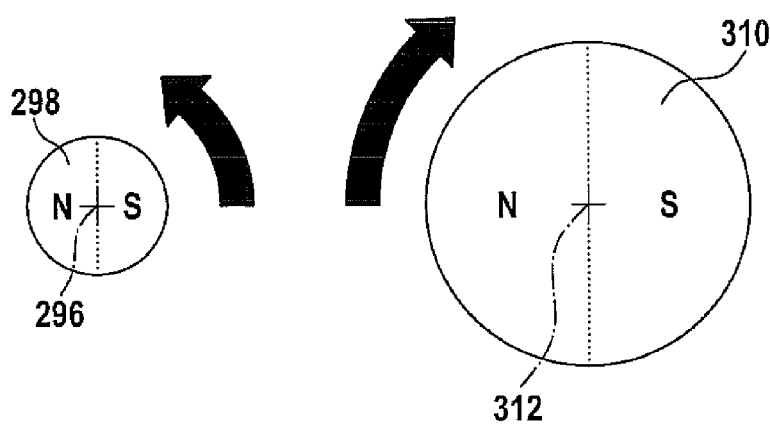

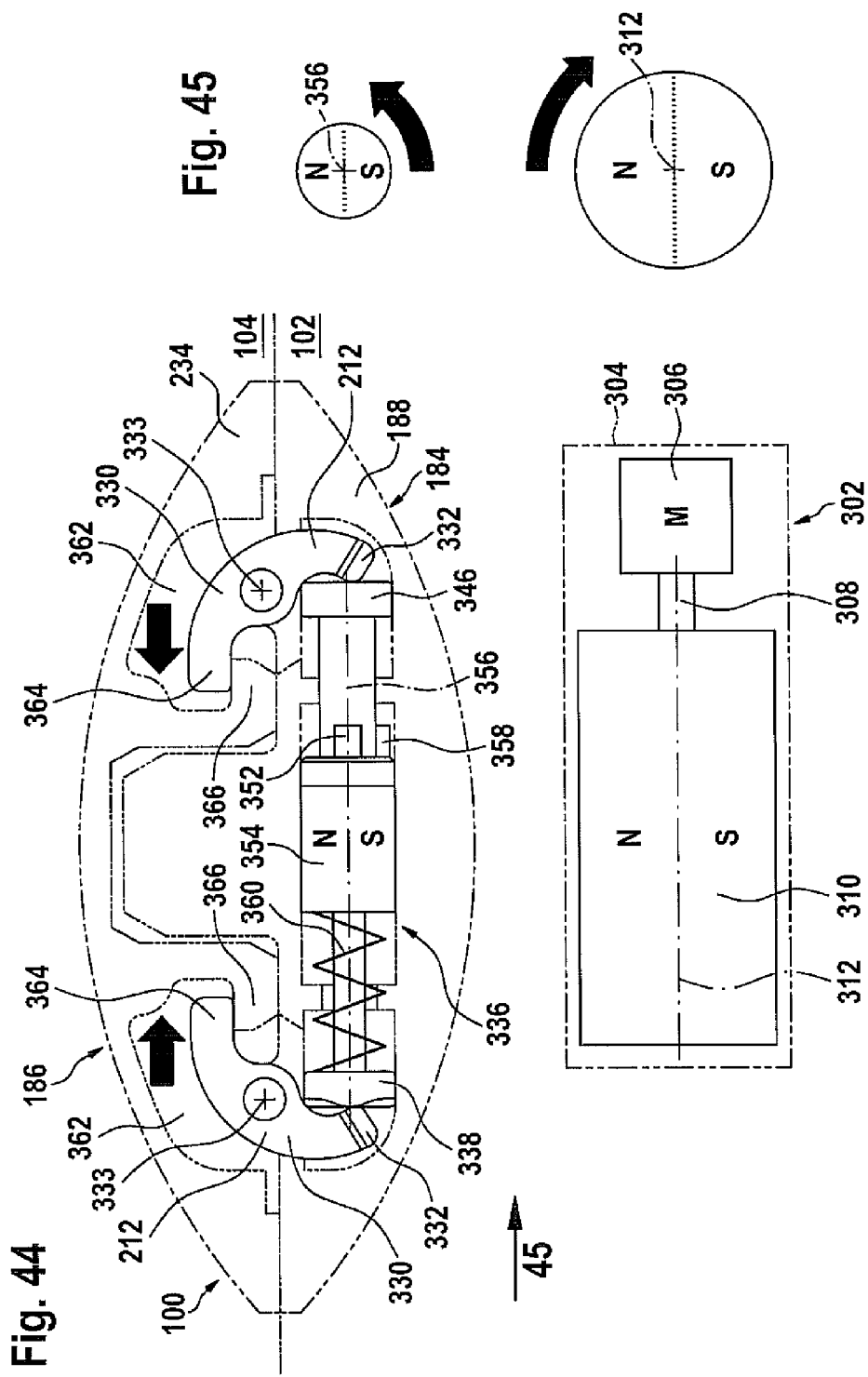

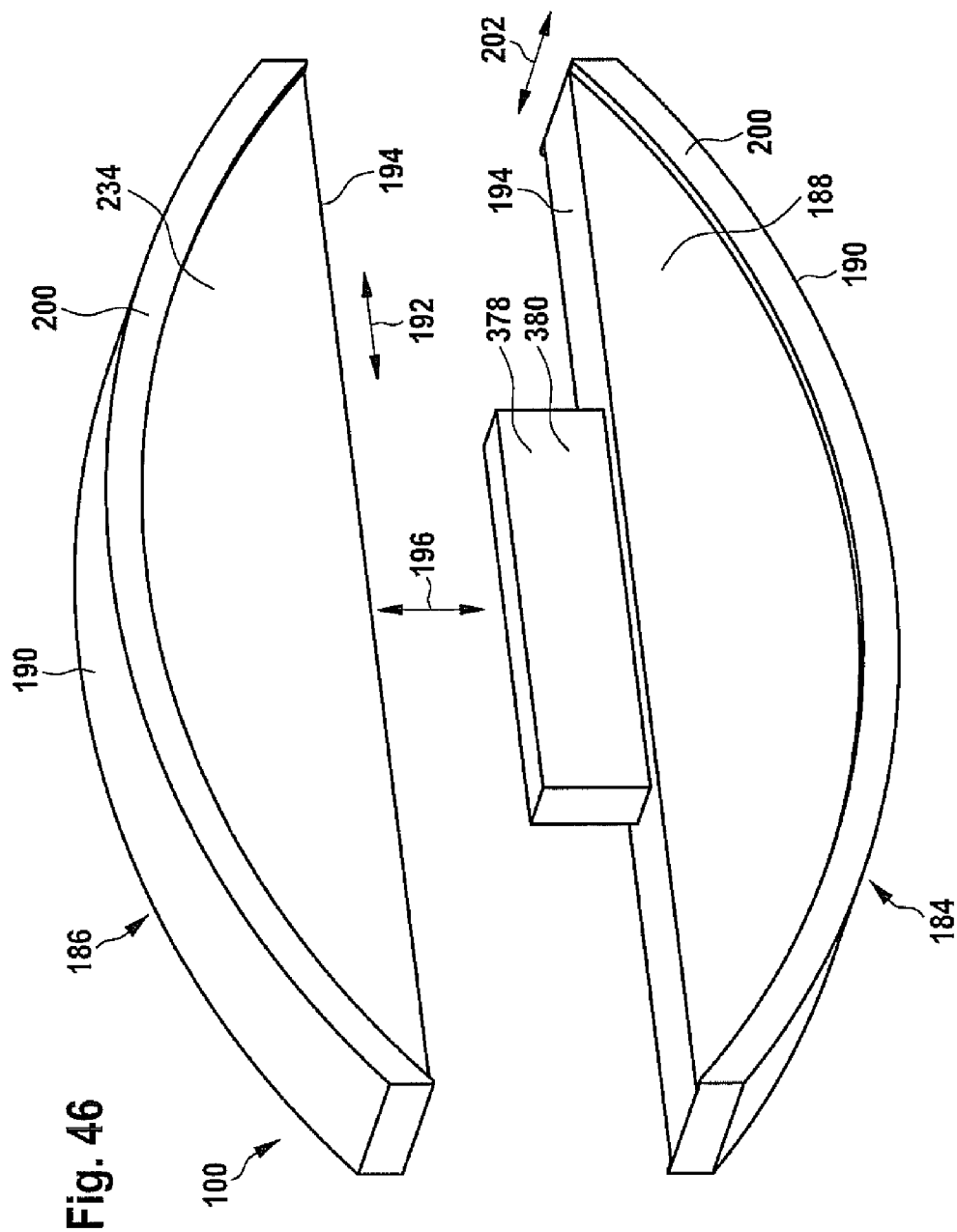

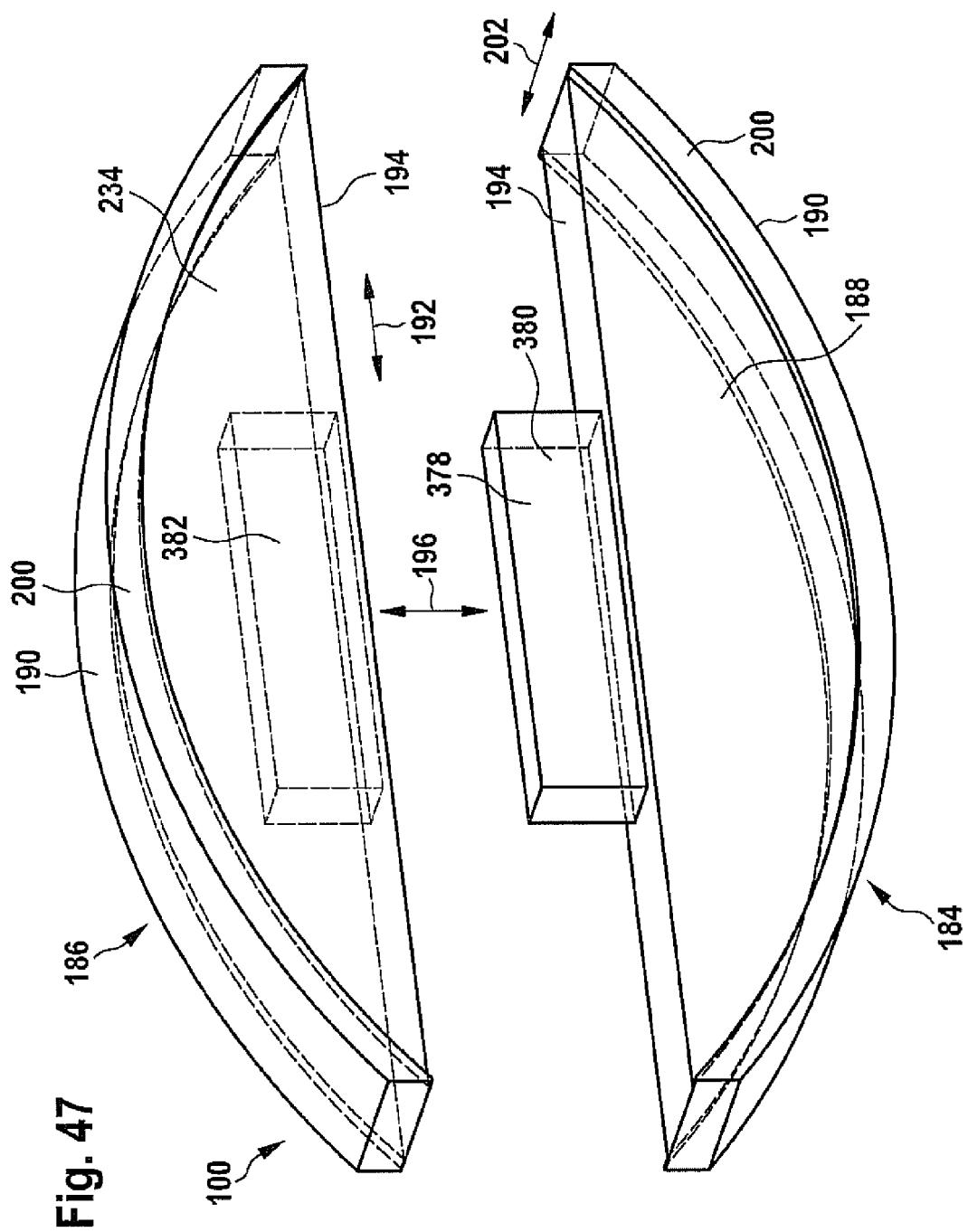

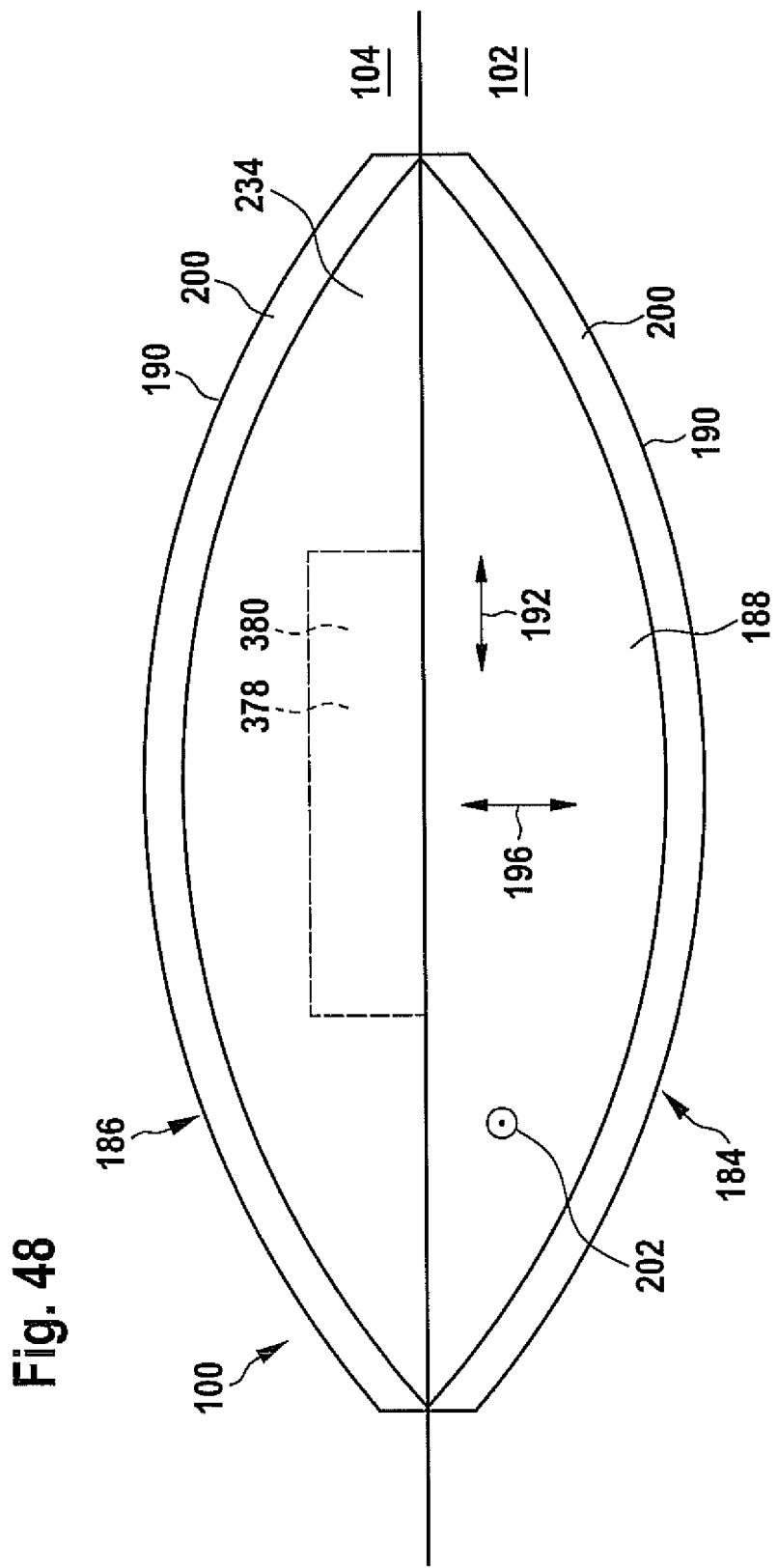

CONNECTING MEANS AND METHOD OF PRODUCING A CONNECTION BETWEEN A FIRST COMPONENT AND A SECOND COMPONENT

RELATED APPLICATION

This patent is a divisional of U.S. patent application Ser. No. 12/611,748, filed Nov. 3, 2009, which is a continuation of PCT/EP2008/003575 filed May 3, 2008, which claims priority to European Patent Application No. 07 009 267.1, filed on May 8, 2007, each of which are hereby incorporated herein by reference in their entireties.

FIELD OF THE DISCLOSURE

The present invention relates to a connecting means for connecting a first component and a second component, and in particular, for connecting furniture parts or machine parts, comprising
a first connecting element arranged on the first component in the connected state of the components and
a second connecting element arranged on the second component in the connected state of the components.

BACKGROUND

Such a connecting means is known from DE 196 04 243 C2 for example.

DE 196 04 243 C2 discloses a fitting for connecting components, said fitting consisting of two half-fittings which are each fixed to a respective one of the components that are to be connected and comprise elements that are adapted to be brought into engagement with one another for establishing the connection between the components, wherein each of the half-fittings comprises a section in the form of a segment of a circle having self-cutting protruding edges so that each half-fitting is adapted to anchor itself in the relevant component by virtue of being driven into its respectively associated component along the self-cutting edges. In the case of hard materials such as a hardwood or metallic materials for example, the process of driving the half-fittings into the components along the self-cutting edges is extremely difficult or even completely impossible. In addition, there is a danger with the fitting in accordance with DE 196 04 243 C2 that the lateral walls of the respective component could break away when driving-in the half-fittings as a result of the forces arising due to the protruding self-cutting edges.

SUMMARY OF THE INVENTION

The object of the present invention is to provide a connecting means of the type mentioned hereinabove which will enable two components consisting of a plurality of materials to be securely connected to one another without giving rise to the danger of damaging the two components during the assembly process.

In accordance with the invention, this object is achieved in the case of a connecting means comprising the features indicated in the first part of claim 1 in that at least one of the connecting elements comprises at least one non self-cutting holding projection which comprises a curved supporting surface that is in the form of an arc of a circle in longitudinal section, wherein the holding projection can be inserted into a groove which is provided in one of the components and has a curved undercut surface that is in the form of an arc of a circle in longitudinal section.

The concept underlying the solution in accordance with the invention is that the connecting element having the at least one holding projection is to be pushed into a groove which had already been produced in the component prior to the insertion of the connecting element and which has an undercut section in the relevant component in the longitudinal direction of the groove. Hereby, the holding projection can be pushed into the undercut section of the groove in the tangential direction using just a small amount of force so that the connecting element still has a certain degree of freedom of movement in this direction and thus corrections with respect to their mutual positioning are still possible when connecting the components.

Furthermore, with the aid of a curved supporting surface thereon, the holding projection can be supported on the likewise curved undercut surface of the undercut section of the groove in the associated component, whereby this undercut surface is likewise in the form of an arc of a circle in longitudinal section and has the same radius of curvature as the curved supporting surface of the holding projection. A positive connection between the component and the connecting element is produced as a result of the engagement between the holding projection and the undercut section of the groove.

Hereby, particularly effective anchoring of at least one of the connecting elements in the associated component is obtained without having to use a large amount of force when inserting the connecting element into the associated component which could lead to the component being damaged.

In contrast thereto, holding grooves for the half-fittings must first be reamed out by means of the self-cutting protruding edges by forcing the half-fittings into the components when inserting the half-fittings of the fitting known from DE 196 04 243 C2 into the components. For this purpose, it is necessary to exert quite a substantial amount of force. Furthermore, the self-cutting protruding edges must be geometrically optimised for the self-cutting action, and in particular, they need to be sufficiently thin in order to make it possible to force out the reamed-out material. Furthermore, when driving the half-fittings into the components, material can easily be chipped off the outer edges of the component, especially when the half-fittings are being driven-in at the edge of the component. In the case of solid materials such as a hardwood for example, the process of driving-in the half-fittings is extremely difficult; in the case of other materials such as plexiglass for example or in the case of metallic materials, the self-cutting process for driving-in the half-fittings fails completely. Furthermore, after being driven into the respective component, the half-fittings are stuck immovably therein and can no longer be shifted along the holding groove in order to enable corrections in the positioning thereof to be made and thus compensation for tolerances to be effected.

By contrast, the connecting means in accordance with the invention can be used for connecting components of any type of material such as especially hardwood, plexiglass or metallic materials and, due to the fact that at least one of the connecting elements is adapted to be displaced in the longitudinal direction of the groove in which the connecting element is accommodated, it is possible to make positional corrections and thus compensate for the positional tolerances of the grooves in the components and/or compensate for manufacturing tolerances of the connecting elements.

Furthermore, at least one of the connecting elements preferably comprises a curved bearing surface which is in the form of an arc of a circle in longitudinal section so that this bearing surface can slide on a groove base surface that is likewise in the form of an arc of a circle in longitudinal section of a groove that is provided in one of the components, whereby the alignment of the connecting element concerned relative to the other respective connecting element can be changed within certain limits in the course of connecting the connecting elements in order to compensate for the positional tolerances of the grooves in which the connecting elements are arranged, and/or manufacturing tolerances of the connecting elements.

Due to this additional degree of freedom of movement, further corrections with respect to their mutual positioning are possible when assembling the two components, this thereby significantly reducing the need for precision with regard to the location of the grooves in the components and thus leads to it being considerably easier for the user to use.

In particular, the holding projection may comprise stub-like ends and/or have rounded-off, bevelled edges at its end regions.

The cross-sectional area of a non self-cutting holding projection may be of any desired size in order to increase the mechanical stability of the holding projection.

In particular, the cross-sectional area of the holding projection can amount to at least 1 mm$^2$.

The holding projection may have a substantially rectangular or a substantially trapezoidal cross section.

As an alternative or in addition thereto, provision may be made for at least one holding projection to taper with increasing spacing from a base body of the respective connecting element.

On the other hand, provision may be made for at least one holding projection to taper with decreasing spacing from a base body of the respective connecting element.

As an alternative or in addition thereto, it is also conceivable for the cross section of at least one holding projection to have an outer contour which is curved at least in sections thereof.

In a preferred embodiment of the invention, provision is made for the surface of at least one holding projection to be substantially flush with a curved bearing surface of a base body of the respective connecting element. Thus, in this case, the holding projection is arranged on the outermost edge of the associated connecting element facing the groove base.

As an alternative or in addition thereto, provision may also be made for at least one holding projection to be arranged such that it is offset with respect to the curved bearing surface of a base body of the respective connecting element. Thus, in particular, the holding projection may have a smaller radius of curvature than the curved bearing surface of the respective connecting element.

Furthermore, provision may be made for several holding projections having differing radii of curvature to be arranged on the same connecting element.

In particular, a plurality of holding projections having differing radii of curvature can be arranged on the same side of the respective connecting element.

In particular, the curved bearing surface of the base body of the respective connecting element may be in the form of an arc of a circle in longitudinal section.

In particular, the curved bearing surface of at least one connecting element can be substantially in the form of a section of the surface of a regular cylinder.

In a preferred embodiment of the invention, provision is made for the first connecting element and the second connecting element to be connected to one another in releasable manner in the connected state of the components and for at least the first connecting element to comprise at least one holding element which is moveable relative to a housing of the first connecting element and which, in a holding position, cooperates with the second connecting element in such a way that a relative movement of the first connecting element and the second connecting element along the direction of connection is prevented, and which, in a release position, permits a relative movement of the first connecting element and the second connecting element along the direction of connection, whereby at least one holding element is movable from the holding position into the release position and/or from the release position into the holding position by means of an action occurring outside the connecting means.

In this embodiment, the connection of the two connecting elements is not established by a relative displacement of the two connecting elements as a whole but rather, by means of a relative movement of the holding element relative to a housing of the first connecting element from the release position into the holding position. As an alternative or in addition thereto, the connection between the connecting elements can be released by a movement of the holding element relative to the housing of the first connecting element from the holding position into the release position.

When the connecting elements are locked together by the movement of the holding element into the holding position, then, due to the tensile forces which are act on the connecting elements in a direction of connection that is oriented transversely and preferably perpendicularly to the bearing surfaces of the connecting elements, so much friction will be activated that the ability to displace the holding projection within the undercut section of the groove is annulled and an extremely firm connection between the components that are to be connected is established.

The connecting elements of the connecting means in accordance with the invention are placed into pre-existing grooves in the components so that a large amount of force is not necessary to insert the connecting elements into the components and consequently there is no danger of damage to these components.

When the holding element of the connecting means in accordance with the invention has been moved from the holding position into the release position, the connecting elements can be moved away from each other in a direction of connection that is oriented perpendicularly to the bearing surfaces of the connecting elements with which the connecting elements abut one another in the connected state of the components, without the connecting elements having to be previously moved relative to each other in a direction parallel to the bearing surfaces.

In a preferred embodiment of the invention, provision is made for the housing of the first connecting element to have a curved bearing surface that is in the form of an arc of a circle in longitudinal section, and a substantially flat bearing surface which is located opposite the aforesaid bearing surface and is adapted to be placed on the second connecting element.

In particular, provision may be made for the substantially flat bearing surface of the first connecting element to be able to abut a likewise substantially flat bearing surface of the second connecting element.

The substantially flat bearing surface of the first connecting element and/or the second connecting element is preferably oriented substantially parallel to contact areas of the components with which the components abut one another in the connected state of the components.

Furthermore, the curved bearing surface and the substantially flat bearing surface of the first connecting element and/or the second connecting element are oriented substantially perpendicularly to the direction of the connection in the connected state of the components.

In a preferred embodiment of the invention, provision is made for at least one holding element to be held such as to be pivotal on the first connecting element.

In order to effect the connection of the two connecting elements in the holding position of the holding element, provision may be made for at least one holding element to have a first holding contour which engages behind a second holding contour provided on the second connecting element in the holding position.

The first holding contour and/or the second holding contour can be formed such as to be arc-shaped.

In particular, provision may be made for the first holding contour and the second holding contour to be formed such that they are not mutually concentric so that the two connecting elements are pulled against each other when moving the holding element from the release position into the holding position.

Until now, no detailed indications have been given as to the manner in which the holding element is movable from the holding position into the release position or in the reverse direction by means of an action occurring outside the connecting means.

For example, provision may be made for at least one holding element to be movable from the holding position into the release position and/or from the release position into the holding position by means of a mechanical actuating means that can be moved into engagement with the holding element from outside the connecting element.

For this purpose, it is expedient if at least one holding element comprises a seating for an actuating section of a mechanical actuating means.

In particular, provision may be made for at least one holding element to comprise a seating for a polygonal key, an Allen key and/or a screwdriver.

In order to enable the mechanical actuating means to act on the holding element, provision may be made for the first connecting element to comprise a housing having a passage opening for the passage of a mechanical actuating means to a holding element.

In particular, provision may be made for the housing to comprise a side wall which extends transversely to the curved bearing surface of the first connecting element and for the passage opening to be arranged in the side wall.

As an alternative thereto, provision may also be made for the passage opening to be arranged in the curved bearing surface of the first connecting element.

In a special embodiment of the invention, provision may be made for at least the first connecting element to comprise at least two holding elements which are held such as to be pivotal on the first connecting element.

In order to ensure the connection of the two connecting elements in the holding position of the holding elements, provision may be made for at least two holding elements to each engage behind a respective restraining element which is arranged on the second connecting element in the holding position.

In order to enable the holding elements to be pivoted from the release position into the holding position, provision may be made, in particular, for a support region of a first holding element and a support region of a second holding element to be movable relative to each other by means of a spreading mechanism.

Such a spreading mechanism could comprise a magnet element which is adapted to be driven such that it moves within the connecting means by means of a time varying magnetic drive field which acts on the magnet element from outside the connecting means.

In a preferred embodiment of the invention, provision is made for the spreading mechanism to comprise at least two spreading elements which are in engagement with one another.

In particular, the spreading elements may be held in engagement with one another by means of two mutually complementary threads.

It is particularly expedient, if at least one of the spreading elements is adapted to be driven into rotational movement relative to the other spreading element by means of the magnet element.

In particular, the magnet element may comprise a driver element which acts on a driven element on one of the spreading elements.

Furthermore, provision may be made in a special embodiment of the invention for at least one holding element to have a thread.

Provision may be made for at least one holding element to be in engagement with a restraining element in the holding position, wherein said restraining element is arranged on the second connecting element and the restraining element has a thread that is complementary to the thread of the holding element.

In order to facilitate the process of bringing the holding element into engagement with the restraining element, provision may be made for the connecting means to comprises at least one resilient element, and in particular a spring, by means of which the holding element and the restraining element are biased against each other.

Furthermore, a thread axis of the holding element can be oriented substantially parallel to the direction of the connection in the connected state of the components.

In a special embodiment of the invention, provision may be made for the connecting means to comprise a magnet element which can be driven into a rotational movement within the connecting means by means of a time varying magnetic drive field that acts on the magnet element from outside the connecting means.

In particular, by means of such a magnet element, at least one holding element can be adapted to be driven into a rotational movement relative to the housing of the first connecting element.

Hereby, the magnet element may comprise a driver element which acts on a driven element on the holding element.

In order to enable shearing stresses to be removed as well by means of the connection between the connecting elements, it is of advantage if at least one of the connecting elements comprises at least one insertible projection and if the other respective connecting element comprises at least one seating pocket for accommodating the insertible projection in the connected state of the components. Thereby, additional dowel pins such as are necessary with most other connecting means can be dispensed with.

If at least one seating pocket extends to a greater extent in the longitudinal direction of the connecting means than the insertible projection accommodated therein, then this offers the advantage that the first connecting element and the second connecting element are mutually displaceable in the longitudinal direction in order to enable tolerances in the connection between the components to be compensated for in this manner.

As an alternative to a connection between the two connecting elements by means of a moveable holding element, provision may also be made for the first connecting element and the second connecting element to be connected to one another in the connected state of the components by an integral bond.

In particular, provision may be made for the first connecting element and the second connecting element to be glued to one another in the connected state of the components.

Furthermore, the present invention relates to a method of producing a connection between a first component and a second component, in particular, a connection between furniture parts or machine parts.

The object of the present invention is to provide a method which is such as to enable two components consisting of a multiplicity of materials to be securely connected together without giving rise to the danger of damage to one of the components.

This object is achieved by a method which comprises the following method steps:

producing a respective groove in a contact area of the first component and in a contact area of the second component, wherein at least one of the grooves comprises at least one undercut section having a curved undercut surface which is in the form of an arc of a circle in longitudinal section;

inserting a first connecting element into the groove in the first component and a second connecting element into the groove in the second component, wherein at least one of the connecting elements comprises at least one holding projection which has a curved supporting surface that is in the form of an arc of a circle in longitudinal section;

connecting the first connecting element and the second connecting element.

Special embodiments of the method in accordance with the invention form the subject matter of claims 41 to 60, the advantages thereof having already been explained hereinabove in connection with the special embodiments of the connecting means in accordance with the invention.

Furthermore, the present invention relates to a groove milling device for milling a groove in a component, wherein said device comprises a milling disk which is rotatable about a rotational axis and is used, in particular, for carrying out the method in accordance with any of the claims 40 to 60.

The object of the present invention is to provide such a groove milling device with the aid of which a groove can be produced in a simple and precise manner and wherein said groove comprises at least one undercut section having a curved undercut surface.

In accordance with the invention, this object is achieved in the case of a groove milling device incorporating the features of the first part of claim 61 in that the groove milling device comprises a displacement device for moving the milling disk along the rotational axle during the milling process.

By means of such a groove milling device, a base section of the groove can first be milled and then, when the base section has reached a given depth, the milling disk can be moved along the axis of rotation in order to mill at least one undercut section.

In particular, the groove milling device in accordance with the invention may comprise a stop means for limiting the depth of the milled groove.

Furthermore, the groove milling device may comprise a switch for actuating the displacement device by an operator during the milling process in order to enable the movement of the milling disk along the axis of rotation to be initiated manually.

As an alternative or in addition thereto, provision may also be made for the groove milling device to comprise a control device which automatically actuates the displacement device when the milled groove has reached a given depth during the milling process. In this way, the effect is achieved that the milling disk can be immediately moved along the axis of rotation for producing the undercut section as soon as the given groove depth has been reached; this can shorten the time needed for the entire milling process by a considerable amount.

In a preferred embodiment of the invention, provision is made for the milling disk to be caused to move along the rotational axis by means of the displacement device from a basic position into a first undercut position and afterwards, in the opposite direction, into a second undercut position beyond the basic position. In this way, a groove can be produced with two undercut sections which project from a base section of the groove in mutually opposite directions.

Preferably, the length of path over which the milling disk is movable along the rotational axis by means of the displacement device is adjustable to various values.

The energy required for the actuation of the displacement device can be generated by means of a generator which is coupled to a main drive spindle of the groove milling device for example.

In particular hereby, the generator can be in the form of an eddy-current coupling.

Furthermore, the present invention relates to a groove milling device for milling a groove in a component which comprises a T-groove cutter that is rotatable about a radial direction of the groove, and in particular, a device for carrying out the method in accordance with any of the claims 40 to 60.

The object of the present invention is to provide such a groove milling device with the aid of which a groove having at least one undercut section having a curved undercut surface which is in the form of an arc of a circle in longitudinal section can be produced in a simple and precise manner.

In accordance with the invention, this object is achieved in the case of a groove milling device incorporating the features indicated in the first part of claim 69 in that the groove milling device comprises a guidance device for guiding the groove milling device in a pre-milled guide groove having a curved groove base surface which is in the form of an arc of a circle in a longitudinal section.

A pre-milled guide groove without undercut sections can be widened into the desired groove with undercut sections with the aid of this groove milling device in accordance with the invention.

Hereby, the guide groove can be pre-milled using a conventional groove milling device.

In a preferred embodiment of the groove milling device in accordance with the invention, provision is made for the guidance device to comprise a front guide element which is in the form of a section of a substantially circular disk and is arranged in front of the T-groove cutter in the direction of movement of the groove milling device during the milling process.

In order to obtain stable guidance of the groove milling device in the pre-milled guide groove by means of the front guide element, it is expedient if the thickness of the front guide element is of substantially the same size as the width of the pre-milled guide groove.

Furthermore, it is expedient if the guidance device comprises a rear guide element which is in the form of a section of a substantially circular disk and is arranged behind the T-groove cutter in the direction of movement of the groove milling device during the milling process. In this way, it is possible to obtain additional guidance for the groove milling device in the groove produced by means of the T-groove cutter.

In order to enable particularly stable guidance on the base section of the groove milled by the T-groove cutter to be obtained, it is expedient if the thickness of the rear guide element is of substantially equal to the width of a base section of the groove milled by the T-groove cutter.

Furthermore, the rear guide element can be provided with at least one guide tooth which engages in an undercut section of the groove milled by the T-groove cutter during the milling process and thus guides the groove milling device. This thereby provides particularly stable guidance for the groove milling device on the undercut section milled by the T-groove cutter.

Further features and advantages of the invention form the subject matter of the following description and the graphical illustration of exemplary embodiments.

BRIEF DESCRIPTION OF THE DRAWINGS

FIG. 23 a schematic side view of the first component into the groove of which the first connecting element is inserted;

FIG. 24 a schematic side view of both components with inserted connecting elements which are to be moved towards one another;

FIG. 25 a schematic side view of the components with the contact areas thereof lying close together and a polygonal key which is in engagement with the holding element of the first connecting element through an access boring;

FIG. 26 a schematic side view of the two components and the polygonal key by means of which the holding element is moved from a release position into a holding position;

FIG. 32 a schematic perspective illustration of a second embodiment of the connecting means in which the holding part of the first connecting element is in the form of a threaded element which can engage in a restraining element provided on the second connecting element;

FIG. 33 a schematic perspective illustration corresponding to FIG. 32 in which the non visible edges are additionally drawn-in in broken lines;

FIG. 34 a schematic side view of the two components which are connected together by means of the second embodiment of the connecting means;

FIG. 35 a schematic perspective illustration of a third embodiment of the connecting means in which a magnet element is provided in the first connecting element for causing a holding element to execute a rotational movement;

FIG. 36 a schematic perspective illustration corresponding to FIG. 35 in which the non visible edges are additionally drawn-in in broken lines;

FIG. 37 a schematic side view of the two components which are connected together by means of the third embodiment of the connecting means;

FIG. 38 a schematic side view of a magnet element and a holding element of the third embodiment of the connecting means depicted in FIGS. 35 to 37 and a drive unit for producing a rotational movement of the magnet element;

FIG. 39 a schematic plan view from below of the magnet element and the drive unit depicted in FIG. 38 along the line of sight indicated by the direction of the arrow 39 in FIG. 38;

FIG. 44 a schematic side view of the fourth embodiment of the connecting means, of a magnet element of the spreading mechanism and of a drive unit for causing rotation of the magnet element;

FIG. 45 a schematic plan view of the magnet element and the drive unit depicted in FIG. 44 along the line of sight indicated by the direction of the arrow 45 in FIG. 44;

FIG. 46 a schematic perspective illustration of a fifth embodiment of the connecting means in which the first connecting element and the second connecting element are glued to one another;

FIG. 47 a schematic perspective illustration corresponding to FIG. 46 in which the non visible edges are additionally drawn-in in broken lines; and FIG. 48 a schematic side view of the connecting means depicted in FIGS. 46 and 47 in the connected state of the components.

DETAILED DESCRIPTION OF THE INVENTION

Similar or functionally equivalent elements are designated by the same reference symbols in each of the Figures.

A first embodiment of a connecting means which is illustrated in FIGS. 1 to 9 and bears the general reference 100 is explained in the following using the example of the connection of a first substantially plate-like component 102 to a second likewise substantially plate-like component 104 (see FIGS. 1 to 4).

The two components 102 and 104 consist for example of wood or plywood, but could consist of any other type of material, for example, of a metallic material or a synthetic material (for example plexiglass). Furthermore, provision may be made for the first component 102 and the second component 104 to consist of materials differing from each other.

Figure 7:
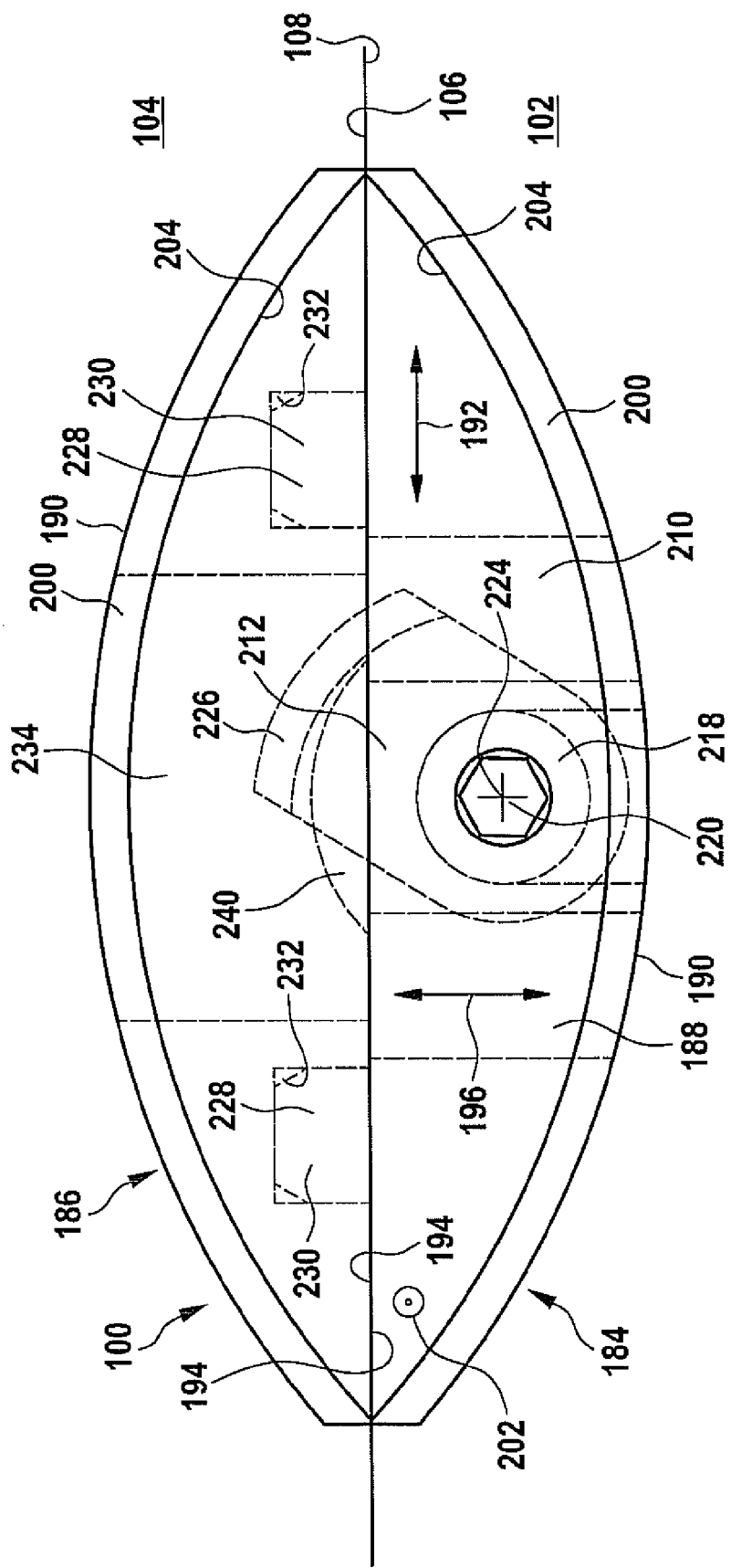
FIG. 7 a schematic perspective side view of the components connected by the connecting means depicted in FIGS. 5 and 6.
Figure 8:
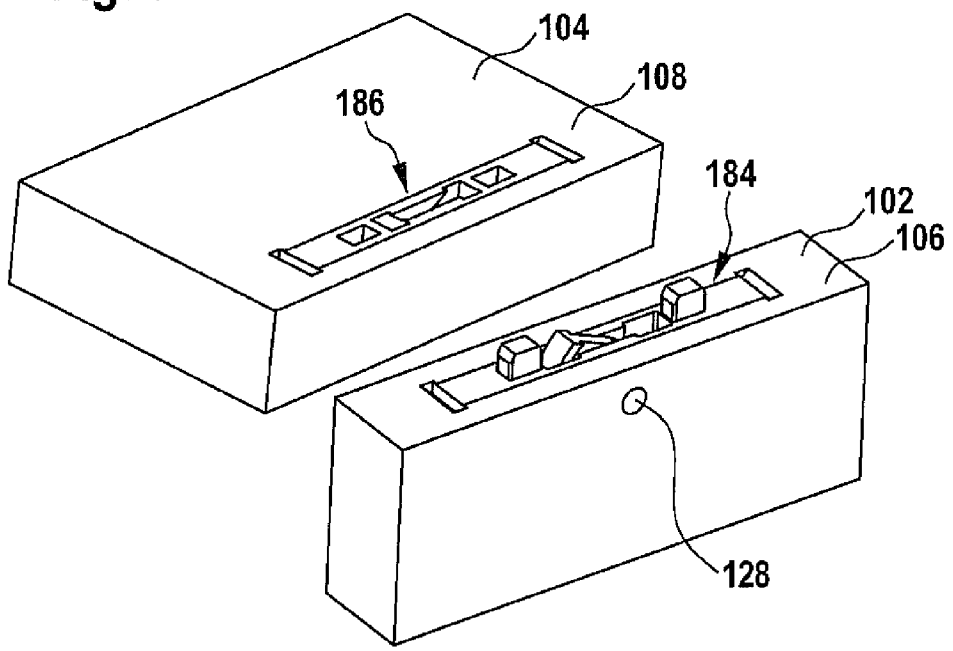
FIG. 8 a schematic perspective illustration of the two components that are to be connected together whilst they are in the unconnected state wherein a respective one of the connecting elements is inserted into the groove in each component.
Figure 9:
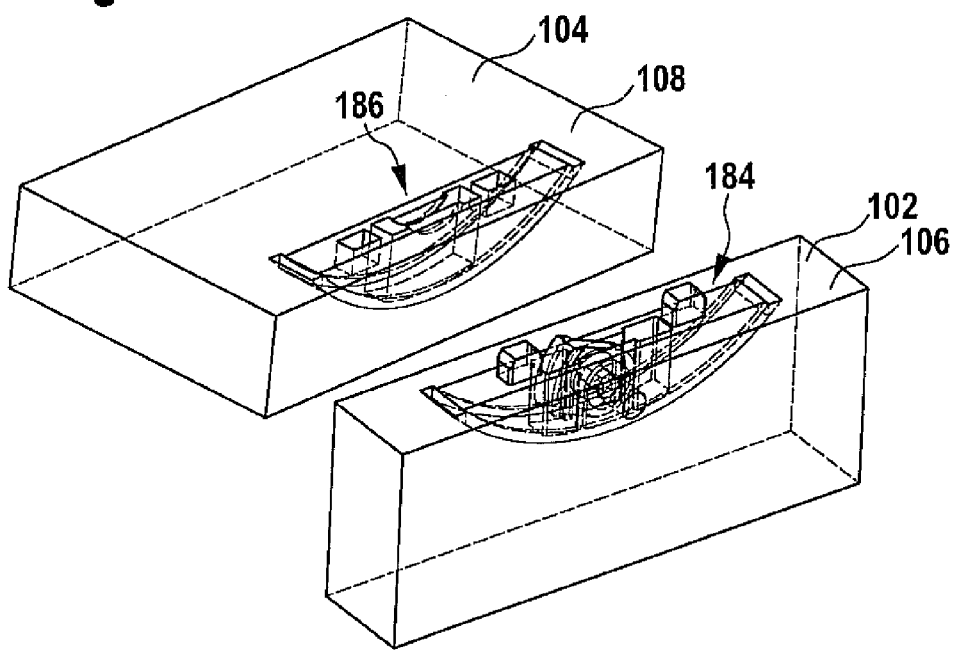
FIG. 9 a schematic perspective illustration corresponding to FIG. 8 in which the non visible edges are additionally drawn-in in broken lines.

In the connected state of the two components 102 and 104 which is illustrated in FIG. 7, a contact area 106 forming a narrow side of the first component 102 abuts a contact area 108 of the second component 104 which forms a major face of the plate-like second component 104.

A respective groove 110, which is formed in the relevant component 102 and 104 and comprises a base section 112 in the form of a segment of a regular cylinder or a section of a regular cylinder and two undercut sections 114 extending away from the base section 112 in the thickness direction 116, opens out into each of the contact areas 106, 108.

The radius of curvature of the base section 112 is larger than the groove depth T (see FIG. 4), so that the arched groove base surface 118 intersects the respective contact area 106, 108 at an acute angle.

The base section 112 of the groove 110 has a width B in the thickness direction 116 of approximately 8 mm for example.

Each of the undercut sections 114 of the groove 110 is bounded on the side thereof remote from the respective contact area 106 and 108 by a base surface 120 which is flush with the groove base surface 118 and is in the form of a section of the surface of a regular cylinder and has the same radius of curvature as the groove base surface 118 of the base section 112.

In the direction toward the contact area 106 or 108, each undercut section 114 is bounded by an undercut surface 122 which is likewise in the form of a section of the surface of a regular cylinder and is formed such as to be concentric with the base surface 120 and has a smaller radius of curvature.

In the lateral direction, each of the undercut sections 114 is bounded by a lateral boundary surface 124 running perpendicularly relative to the respective contact area 106 and 108.

The width b i.e. the extent thereof in the thickness direction 116, for each of the undercut sections 114 amounts to approximately 1 mm for example.

The height h, i.e. the distance between the base surface 120 and the undercut surface 122, for each of the undercut sections 114 amounts to approximately 2 mm for example.

The base section 112 of each groove 110 is bounded by lateral boundary walls 126 which run substantially perpendicularly relative to the respective contact area 106 or 108 and are spaced from each other by the groove width B.

Figure 1:
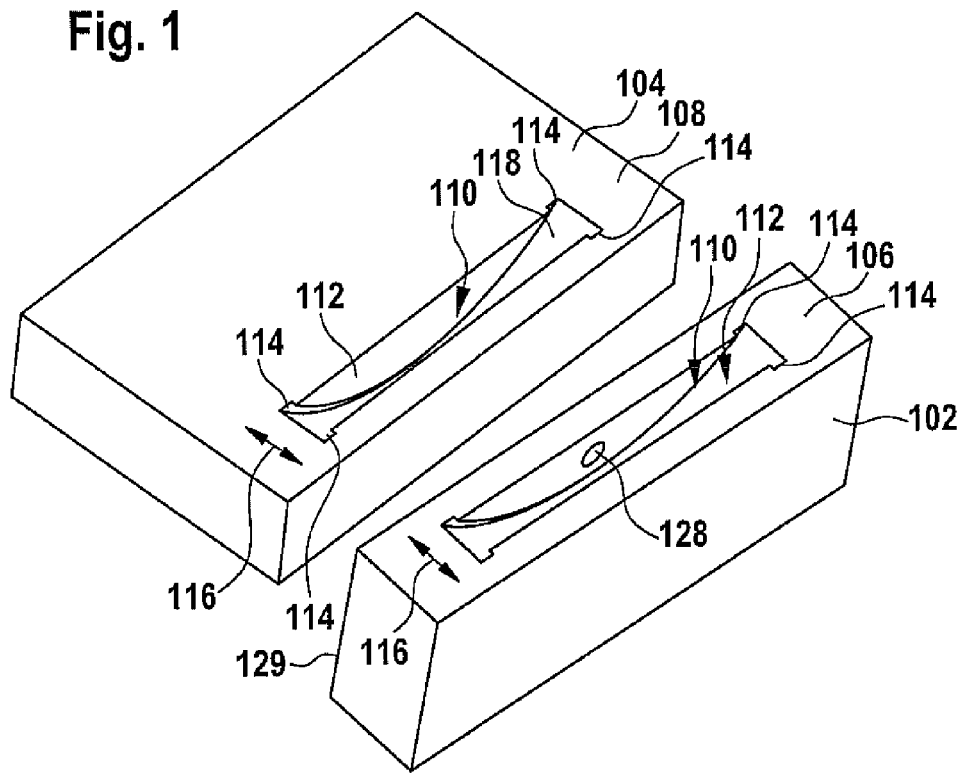
FIG. 1 shows a schematic perspective illustration of two components that are to be connected whilst they are in the unconnected state, wherein each component comprises a respective groove having a central base section and two arc-shaped undercut sections protruding from the base section.
Figure 2:
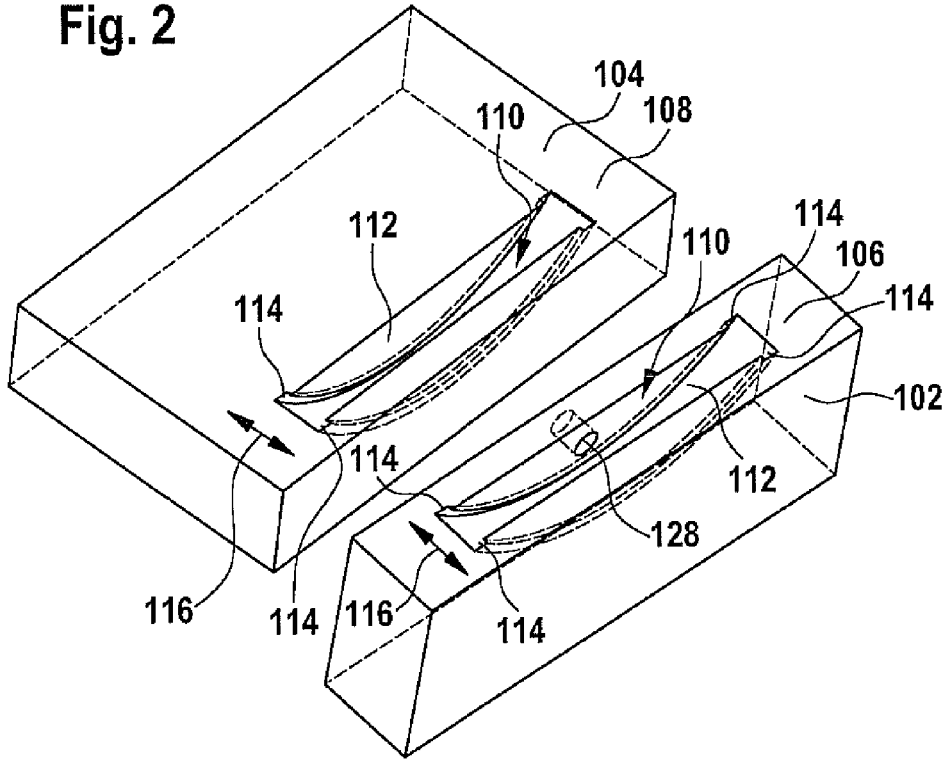
FIG. 2 a schematic perspective illustration corresponding to FIG. 1 in which the non visible edges are additionally drawn-in in broken lines.
Figure 3:
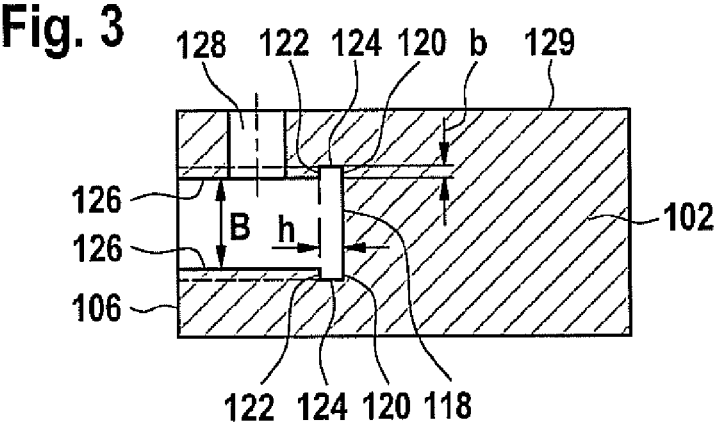
FIG. 3 a schematic cross section through the first component depicted in FIGS. 1 and 2 in the vicinity of an access boring.
Figure 4:
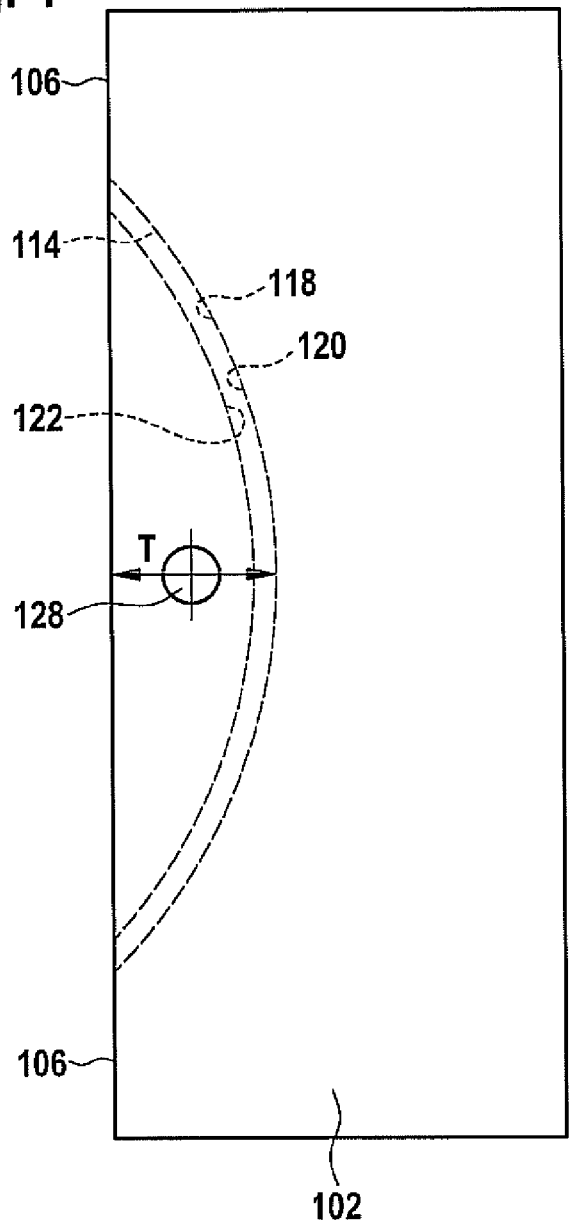
FIG. 4 a schematic side view of the first component depicted in FIGS. 1 and 2.

As can be seen from FIG. 3 for example, a substantially cylindrical access boring 128 opens out into the groove 110 of the first component 102, said boring running perpendicularly relative to one of the lateral boundary walls 126 and the other end thereof opening out at a major face 129 of the plate-like first component 102, this thereby enabling access to the base section 112 of the groove 110 to be made from the exterior of the first component 102.

Figure 10:
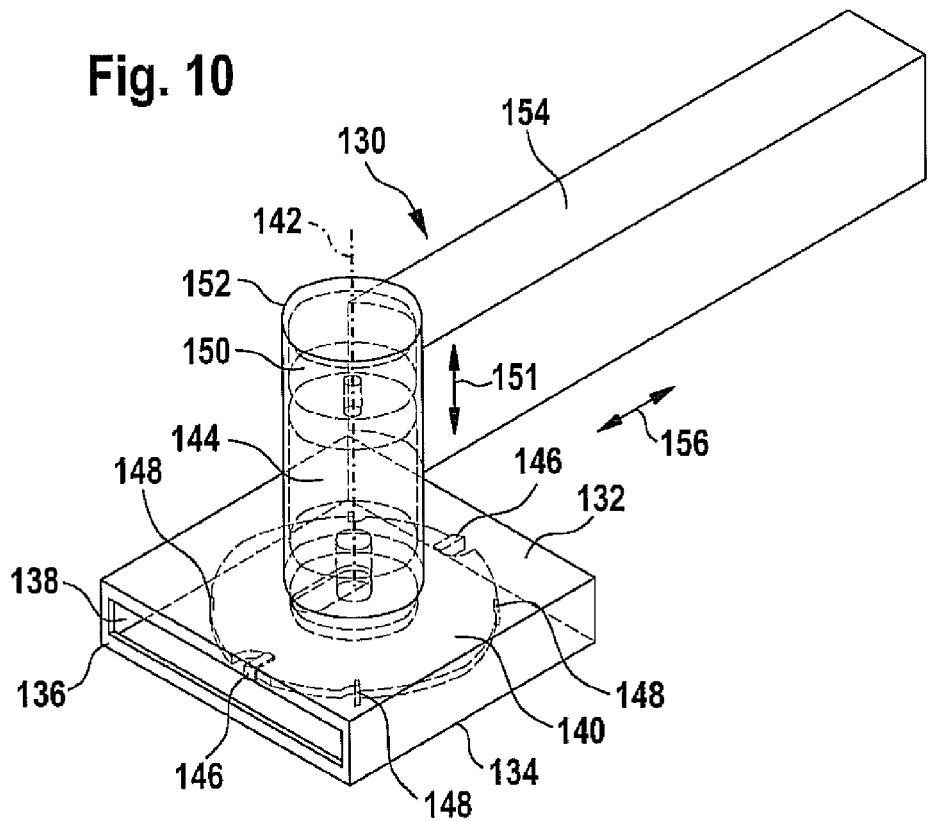
FIG. 10 a schematic perspective illustration of a groove cutting device including a displacement device, wherein a rotatable milling disk of the groove cutting device is withdrawn into a housing of the groove cutting device.
Figure 11:
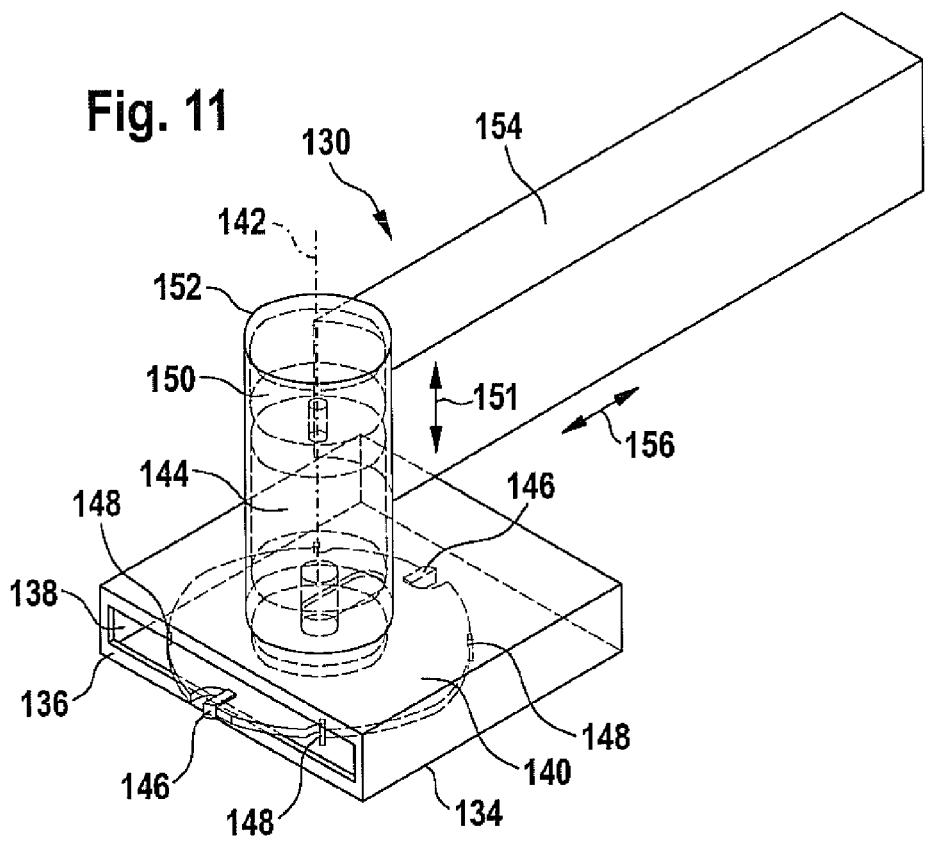
FIG. 11 a schematic perspective illustration of the groove cutting device corresponding to FIG. 10 wherein the rotatable milling disk has been partly extended from the housing of the groove cutting device.

In order to form the previously described grooves 110 in the components 102 and 104, the groove cutting device 130 schematically illustrated in FIGS. 10 and 11 can be used for example.

This groove cutting device 130 comprises an electrically insulated housing 132 which has a substantially flat lower bearing surface 134 and, oriented at right-angles thereto, a substantially flat front bearing surface 136.

The front bearing surface 136 comprises a passage slot 138 through which a section of a milling disk 140 can pass, said disk being held such that it can rotate about a vertical rotational axis 142 in the interior of the housing 132 and it is caused to make such a rotational movement about the rotational axis 142 by means of an electrical drive motor 144.

The milling disk 140 comprises radially projecting milling teeth 146 around its periphery for milling the base section 112 of a groove 110 and annular groove teeth 148 which project in the axial direction and serve for milling the undercut sections 114.

The drive motor 144 and the milling disk 140 attached thereto can be raised or lowered automatically along the axial direction 151 of the milling disk 140 by means of a displacement device 150. The displacement device 150 and the drive motor 144 are accommodated in a drive unit 152 of the groove cutting device 130 which is displaceable relative to the housing 132, by means of a handle 154 arranged thereon, in a displacement direction 156 running radially relative to the rotational axis 142 of the milling disk 140 and perpendicularly relative to the front stop surface 136.

The displacement device 150 for the axial movement of the milling disk 140 can be implemented as a normal electric motor and associated transmission or as a stepping motor.

The necessary energy for the displacement movement can be produced by means of a mains power pack or a generator which is coupled to the main drive spindle of the groove cutting device 130.

In particular, the generator can be implemented as an electrically controllable eddy-current coupling wherein an arbitrarily adjustable torque can be transferred to a reciprocating means which can mechanically convert this torque into a reciprocating movement of the milling disk 140 without the use of an additional motor, for example, by means of a crank drive arrangement or with the help of an adjustable swash plate.

The stroke path, over which the milling disk 140 is raised or lowered in the axial direction 151 by the actuation of the displacement device 150, is manually selectable by means of a selector switch or by means of a CNC control system.

The manner of functioning of the previously described groove cutting device 130 is as follows:

The front bearing surface 136 of the groove cutting device 130 is placed on the contact area 106 of that component (for example the first component 102) in which the groove 110 is intended to be formed.

Figure 12:
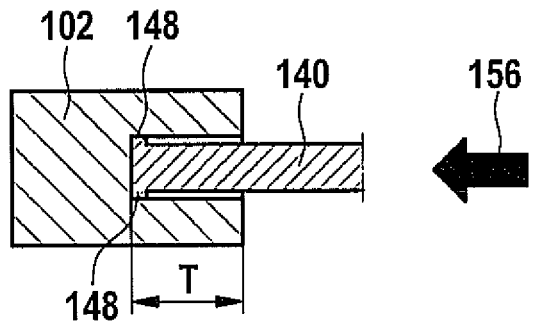
FIGS. 12 to 15 a sequence of schematic cross sections through a component in which a groove incorporating a base section and two undercut sections protruding from the base section is being milled by means of the groove cutting device depicted in FIGS. 10 and 11.

Subsequently, the milling disk 140 is set into rotational movement and is pushed out of the housing 132 against the component 102 that is to be worked upon by means of the handle 154 so that the milling disk 140 mills out from the component 102 a base section 112 which is in the form of a section of a regular cylinder having an increasing groove depth (see FIG. 12).

Figure 13:
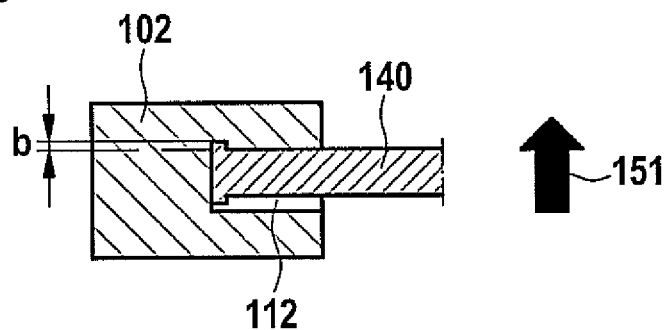

When the desired groove depth T is reached, a displacement process of the milling disk 140 is initiated by means of the displacement device 150, whereupon the milling disk 140 is moved upwardly in the axial direction 151 by the desired width b of the undercut section 114 and the upper undercut section 114 of the groove 110 is then milled by means of the annular groove teeth 148 (see FIG. 13).

Figure 14:
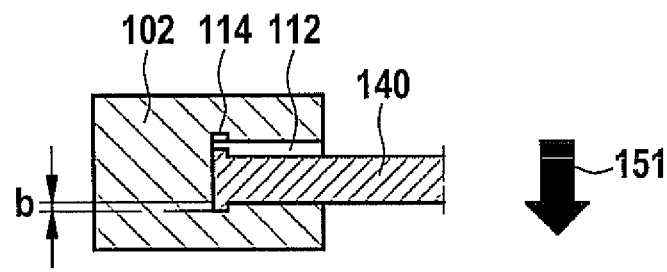

Subsequently, the milling disk 140 is moved downwardly in the opposite direction back into the initial position and then continues to be moved further downwardly by the desired width b of the undercut section 114, whereby the annular groove teeth 148 of the milling disk 140 now mill the lower undercut section 114 (see FIG. 14).

Figure 15:
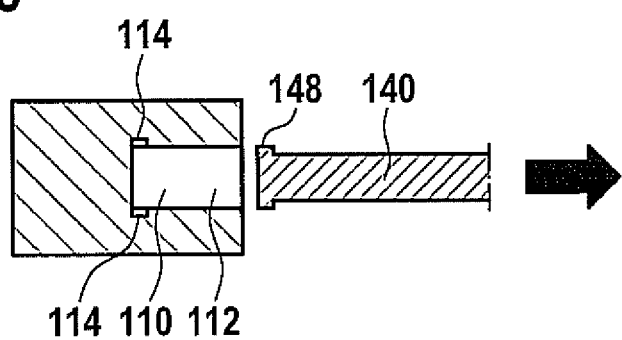

When the lower undercut section 114 has also been milled, the milling disk 140 is moved back upwardly along the axial direction 151 into its initial position and is withdrawn from the finished groove 110 in the direction of displacement 156 by pulling back the handle 154 (see FIG. 15).

Initiation of the displacement process can be effected by means of a manually operated switch on the groove cutting device 130 for example.

As an alternative thereto, provision may also be made for the groove cutting device 130 to comprise a depth probe which automatically initiates the displacement process of the displacement device 150 when the desired groove depth T is reached i.e. when the milling disk 140 has moved out from the housing 132 by a predetermined distance.

Once the displacement process has been initiated, the further time sequence of the displacement process, i.e. the movement of the milling disk 140 upwardly by the distance b, the subsequent movement of the milling disk 140 downwardly by the distance 2b and the concluding movement of the milling disk 140 upwardly by the distance b into the starting position is effected automatically by appropriately controlling the displacement device by means of a (not illustrated) control device of the groove cutting device 130.

In this way, the groove 110 including the undercut sections 114 can be produced in a simple manner in just a single processing step.

Figure 16:
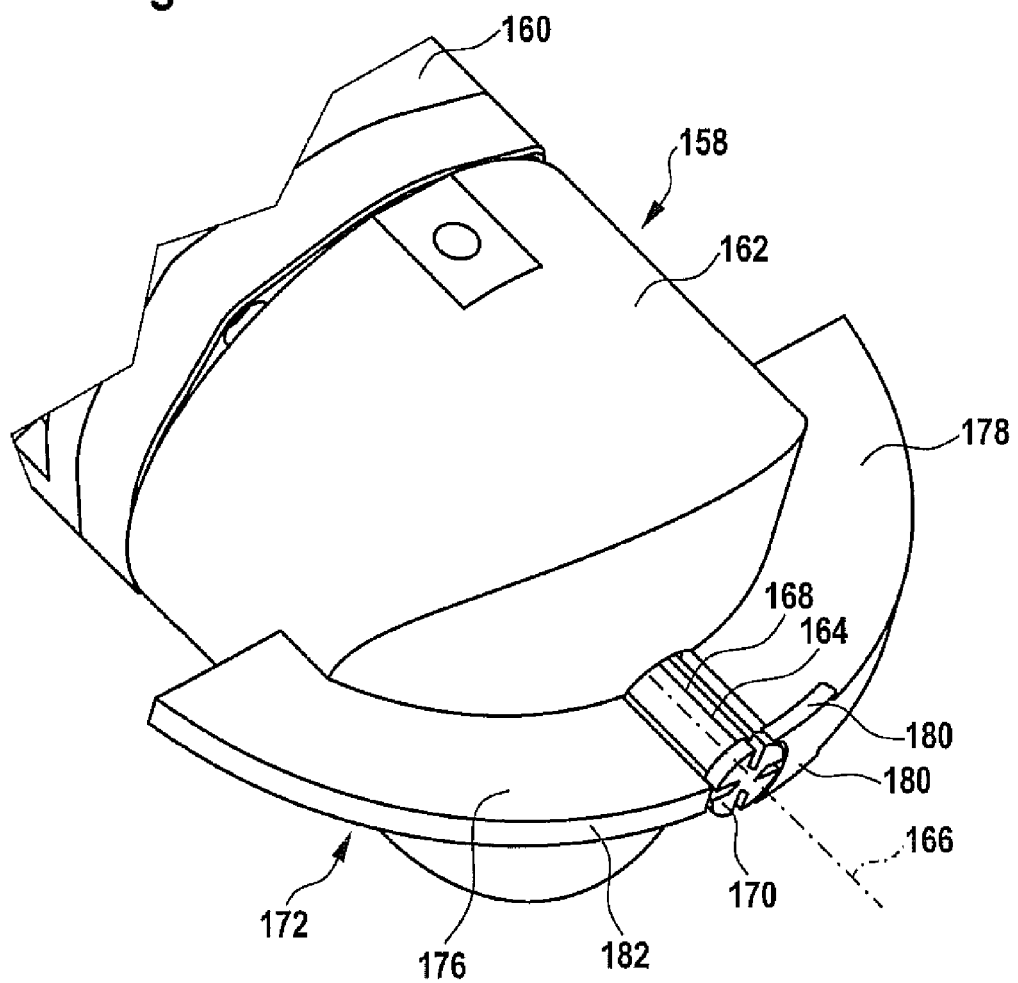
FIG. 16 a schematic perspective illustration of a groove cutting device incorporating a T-groove cutter and a guidance device for guiding the groove cutting device in a pre-milled guide groove.

As an alternative to the groove cutting device 130 illustrated in FIGS. 10 and 11, the groove cutting device 158 illustrated in FIG. 16 could also be used for the production of the grooves 110 in the components 102 and 104.

This groove cutting device 158 comprises an electrical drive unit in an insulated housing 160 and a machining head 162 which is mounted thereon and comprises a T-groove cutter 164 that is rotatable about a rotational axis 166.

The T-groove cutter 164 comprises a shank part 168 having a diameter which corresponds to the diameter B of the base section 112 of the groove 110 that is to be milled, and a head part 170 the diameter of which corresponds to the sum, B+2b, of the widths of the base section 112 and the undercut sections 114.

Figure 17:
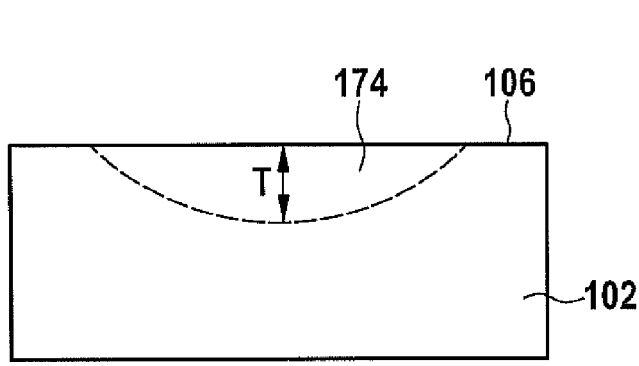
FIGS. 17, 19 and 21 schematic side views of a component in which a groove having a base section and two arc-shaped undercut sections protruding from the base section is milled by means of the groove cutting device depicted in FIG. 16.
Figure 18:
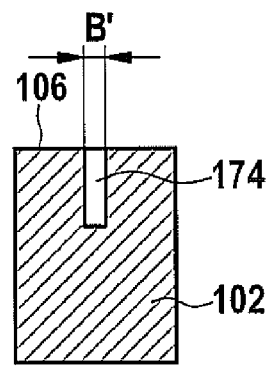
FIGS. 18, 20 and 22 schematic cross sections corresponding to FIGS. 17, 19 and 21 through the groove formed in the component.

Furthermore, the groove cutting device 158 comprises a guidance device 172 for guiding the groove cutting device 158 in a pre-milled guide groove 174 (see FIGS. 17 and 18).

This guidance device 174 comprises a quarter-circular disk-shaped front guide element 174 which is arranged in front of the T-groove cutter 164 in the direction of movement of the groove cutting device 158 during the milling process and the thickness thereof is substantially equal to the width B' of the pre-milled guide groove 174.

Furthermore, the guidance device 172 comprises a substantially quarter-circular disk-shaped rear guide element 178 which is arranged behind the T-groove cutter 164 in the direction of movement of the groove cutting device 158 during the milling process and the thickness thereof corresponds substantially to the width B of the base section 112 of the groove 110 that is to be milled.

Furthermore, the rear guide element 178 is provided with two guide teeth 180 which are arranged directly behind the head part 170 of the T-groove cutter 164 and which extend respectively upwardly and downwardly in the thickness direction of the rear guide element 178 by the desired width b of the undercut sections 114 of the groove 110 that is to be milled.

The groove 110 is produced in the contact area 106 of the first component 102 for example using the previously described groove cutting device 158 as follows:

Firstly, a guide groove 174 in the form of a section of a regular cylinder the groove depth T of which corresponds to the groove depth of the groove 110 that is to be produced and the width B' of which is smaller than the width B of the base section 112 of the groove 110 that is to be formed is produced by means of a groove cutting device which is known and does not therefore need to be described in detail here (see FIGS. 17 and 18).

In particular, the width B' of the guide groove 174 may amount to approximately 4 mm for example.

Subsequently, the guide groove 174 is widened out to form the desired groove 110 with the undercut sections 114 by means of the groove cutting device 158.

For this purpose, the front guide element 176 of the guidance device 172 is entered into the guide groove 174 until such time as the outer surface 182 of the front guide element 176, which is in the form of a section of the surface of a regular cylinder and has the same radius of curvature as the guide groove 174, abuts flush against the groove base surface of the guide groove 174 and the T-groove cutter 164 is still located in front of the contact area 106.

Figure 19:
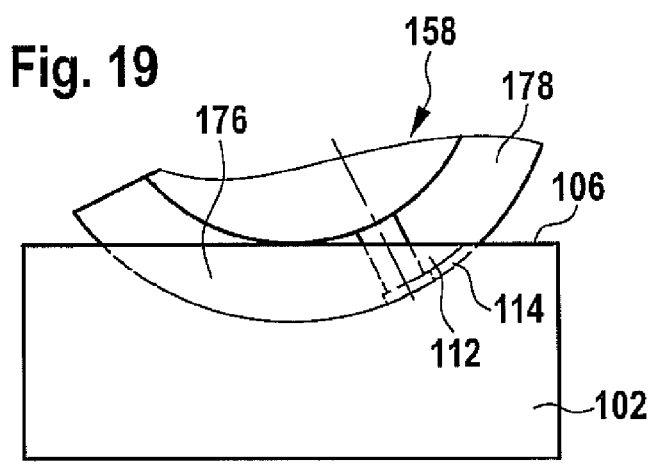
Figure 20:
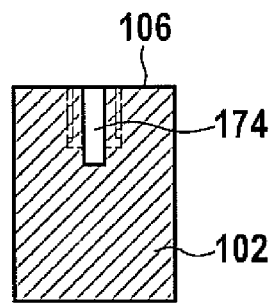

Subsequently, the groove cutting device 158 is pivoted in such a way that the outer surface 182 of the front guide element 176 slides along the arc-shaped curved groove base surface of the guide groove 174 and the T-groove cutter 164 thereby enters into the first component 102 and mills both the widened base section 112 of the groove 110 as well as its undercut sections 114 (see FIGS. 19 and 20).

Thereby, the guide teeth 180 arranged on the rear guide element 178 run in the undercut sections 114 of the groove 110 that were produced by the T-groove cutter 164 and therefore provide additional guidance for the groove cutting device 158.

The groove cutting device 158 continues to be pivoted along the guide groove 174 until such time as the T-groove cutter 164 emerges from the component 102 at the end of the guide groove 174 opposite the starting point and the guide teeth 180 are also no longer in engagement with the undercut sections 114 of the groove 110 that has been produced.

Figure 21:
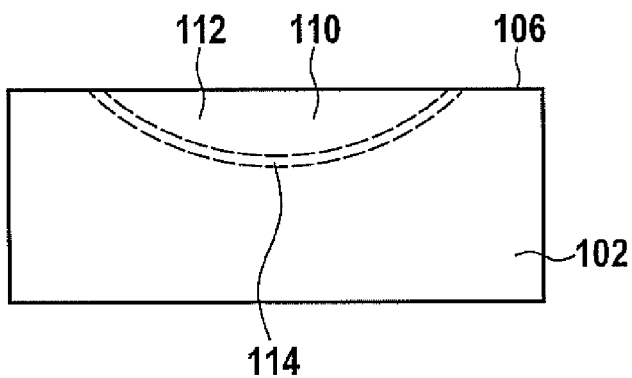
Figure 22:
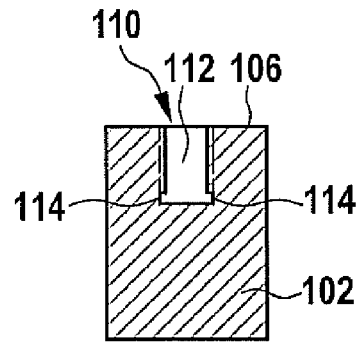

The groove cutting device 158 can now be withdrawn from the component 102, and the groove 110 including its undercut sections 114 is finished (see FIGS. 21 and 22).

After the grooves 110 in the first component 102 and the second component 104 have been produced, the access boring 128 connecting the one major face 129 to the base section 112 of the groove 110 is then produced in the first component 102.

Figure 5:
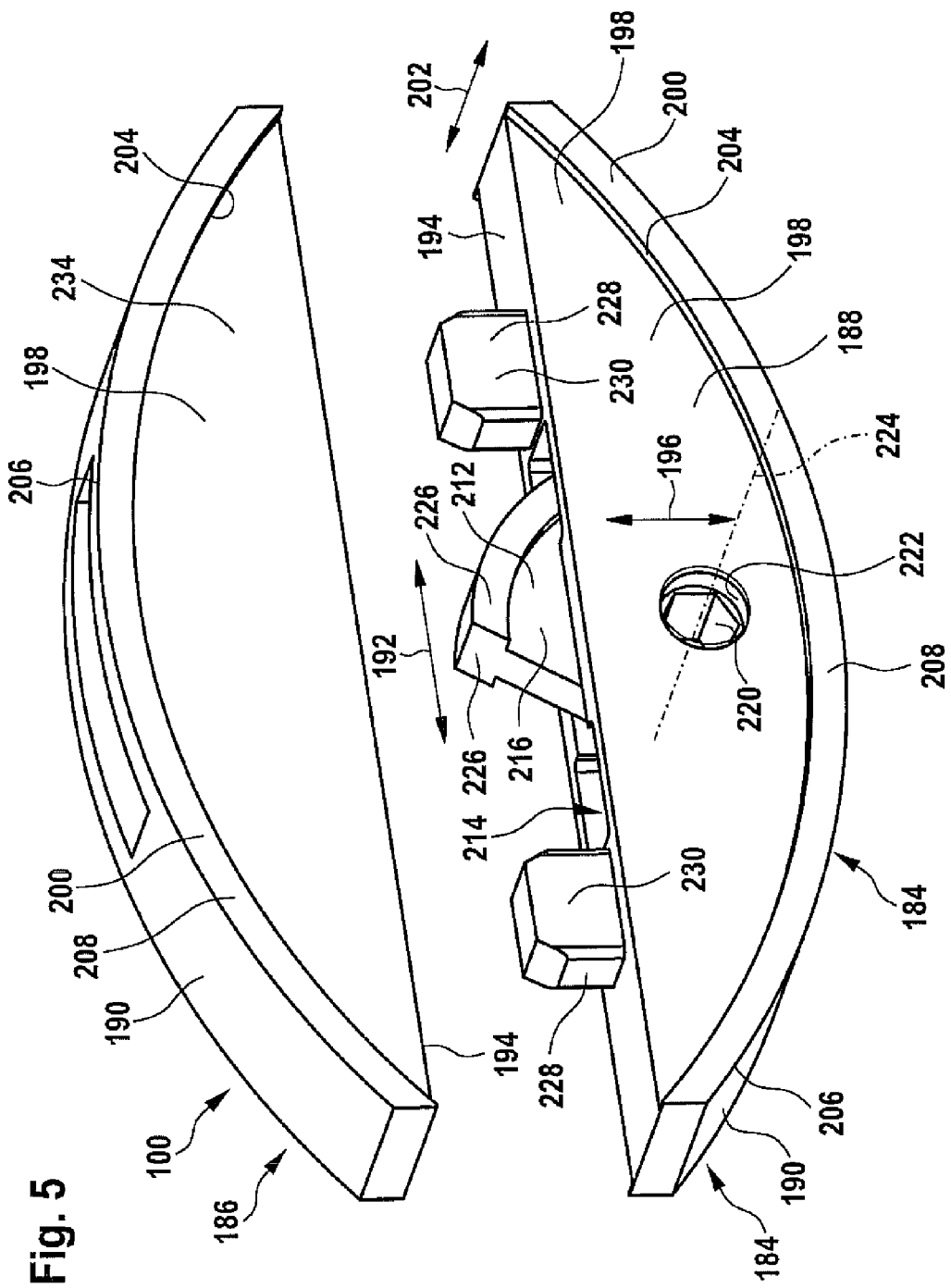
FIG. 5 a schematic perspective illustration of a connecting means for connecting the two components depicted in FIGS. 1 to 4, which comprises a first connecting element having a holding element and a second connecting element having a seating for the holding element.
Figure 6:
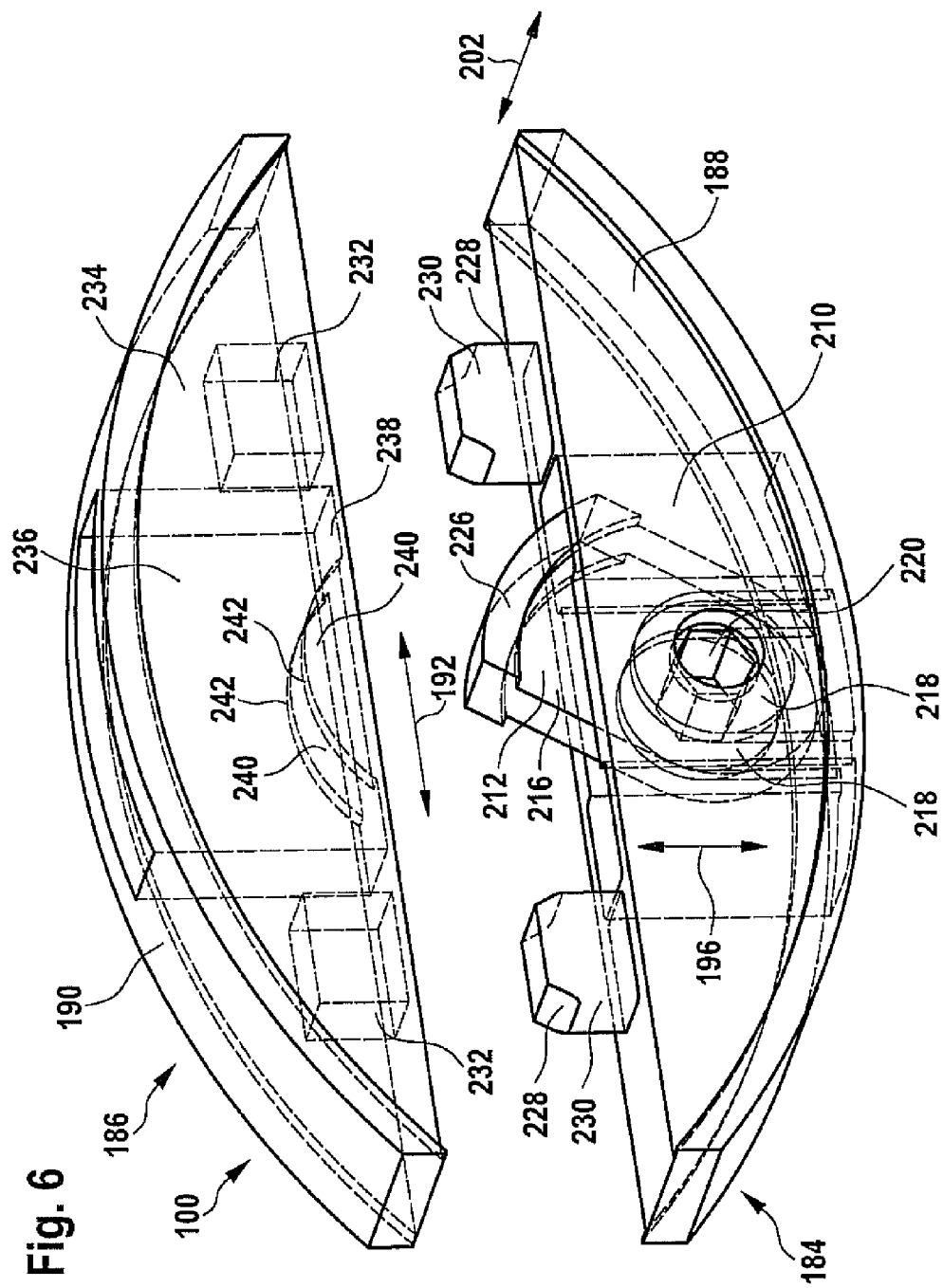
FIG. 6 a schematic perspective illustration corresponding to FIG. 5 in which the non visible edges are additionally drawn-in in broken lines.

The connecting means 100 which connects the two components 102 and 104 together comprises a first connecting element 184 for insertion into the groove in the first component 102 and a second connecting element 186 for insertion into the groove 110 in the second component 104, such as are illustrated in FIGS. 5 to 7.

The first connecting element 184 comprises a housing 188 that is substantially in the form of a section of a regular cylinder and includes an arc-shaped curved bearing surface 190 which is in the form of an arc of a circle in a longitudinal section taken in the longitudinal direction 192 of the connecting element 184, and also a flat bearing surface 194 located opposite the curved bearing surface 190 as well as two lateral side faces 198 running substantially parallel to the direction of connection 196.

A respective arc-shaped curved holding projection 200 protrudes from the lower edge of the side faces 198 in a thickness direction 202 which is perpendicular to the longitudinal direction 192 and the direction of connection 196.

Each holding projection 200 is bounded in the direction towards the bearing surface 194 by an arc-shaped curved supporting surface 204 which is in the form of an arc of a circle in a longitudinal section taken along the longitudinal direction 192

Each holding projection 200 is bounded on the side remote from the bearing surface 194 by a likewise arc-shaped curved bearing surface which is in the form of an arc of a circle in a longitudinal section taken along the longitudinal direction 192 and adjoins the bearing surface 190 of the housing 188 in flush manner.

The supporting surface 204 and the bearing surface 206 of each holding projection 200 are connected to one another by a side face 208 which runs substantially parallel to the longitudinal direction 192 and is parallel with the direction of connection 196.

The profile of each holding projection 200 substantially corresponds to the profile of the respectively associated undercut section 114 of the groove 110, and the curvature of the holding projection 200 corresponds to the curvature of the associated undercut section 114 so that the holding projections 200 of the first connecting element 184 are insertible into the undercut sections 114 of the groove 110 and are adapted to be displaced therein in sliding manner.

Furthermore, the first connecting element 184 comprises a seating chamber 210 that is surrounded by the housing 188 for accommodating a holding element 212 which can emerge from the seating chamber 210 through a mouth 214 at which the seating chamber 210 opens out into the bearing surface 194 of the first connecting element 184.

The seating chamber 210 can extend on the side thereof remote from its bearing surface 194 into the curved bearing surface 190.

The holding element 212 comprises a plate-like base body 216 which, at one end, is provided with ring-like elevated portions 218 that surround a seating opening 220 having a polygonal cross section which is aligned with a substantially circular passage opening 222 in one of the side faces 198 of the housing 188.

The ring-like elevated portions 218 are supported on abutments which are arranged in the seating chamber 210 so that the holding element 212 is held on the housing 188 such as to be rotatable about the central axis 224 of the seating opening 220.

The free end of the holding element 212 remote from the ring-like elevated portions 218 is provided with arc-shaped projections 226 which project from the base body 216 on both sides thereof in the thickness direction 202.

Furthermore, on both sides of the mouth 214 of the seating chamber 210, the first connecting element 184 comprises a respective insertible projection 228 in the form of a substantially parallelepipedal dowel pin 230 which extends in the direction of the connection 196 commencing from the bearing surface 194 and tapers towards the end thereof remote from the bearing surface 194 in order to facilitate the insertion thereof into a respective seating pocket 232 of the second connecting element 186 that is complementary to the dowel pin 230.

The insertible projections 228 of the first connecting element 184 fit very precisely into the seating pockets 232 of the second connecting element 186 in the thickness direction 202 so that the insertible projections 228 can accommodate the shear stresses of the connection between the components 102 and 104 in the thickness direction 202, and, additional dowel pins, such as are necessary in the case of most other connecting means, can be dispensed with.

In the longitudinal direction 192 however, the seating pockets 232 have a greater extent than the insertible projections 228 so that the first connecting element 184 and the second connecting element 186 can be mutually displaced in the longitudinal direction 192 in order to enable the tolerances in the connection between the components 102 and 104 to be compensated for in this way.

The second connecting element 186 likewise comprises a housing 234 which is substantially in the form of a section of a regular cylinder and has an arc-shaped curved bearing surface 190 that is in the form of an arc of a circle in a longitudinal section taken along the longitudinal direction 192 of the connecting element 186, a flat bearing surface 194 located opposite the curved bearing surface 190, side faces 198 and holding projections 200 which protrude from the side faces 198 in the thickness direction 202, said projections having a curved supporting surface 204 directed towards the bearing surface 194, a curved bearing surface 206 that is flush with the bearing surface 190 and a side face 208.

Furthermore, as can best be seen from FIG. 6, apart from the seating pockets 232 for the insertible projections 228 of the first connecting element 184, the housing 234 of the second connecting element 186 also comprises a receiving chamber 236 which is arranged centrally between the seating pockets 233 and opens out into a mouth 238 in the bearing surface 194 and can extend into the bearing surface 190 on the opposite side.

Protruding into the interior of the receiving chamber 236 from both sides of the mouth 238, there is a respective restraining projection 240 which is in the form of a section of a regular cylinder and has an arc-shaped curved restraining surface 242 in the thickness direction 202 so as to leave a gap between the two restraining projections 240 the width of which is slightly greater than the thickness of the base body 216 of the holding element 212 of the first connecting element 184.

For the purposes of establishing the releasable connection between the first component 102 and the second component 104 by means of the connecting means 100 consisting of the first connecting element 184 and the second connecting element 186, one proceeds as follows:

Firstly, as is illustrated in FIG. 23, the first connecting element 184 is pushed into the groove 110 in the first component 102 in such a way that the holding projections 200 of the first connecting element 184 engage in the undercut sections 114 of the groove 110 and the passage opening 222 in the side face 198 of the housing 188 aligns with the access boring 128 in the first component 102 (see FIG. 24).

In like manner, the second connecting element 186 is pushed into the groove 110 in the second component 104 in such a way that its holding projections 200 engage in the undercut sections 114 of the groove 110 and the housing 234 of the second connecting element 186 is accommodated substantially entirely in the groove 110 (see FIG. 24).

The holding element 212 of the first connecting element 184 is then pivoted completely into the seating chamber 210 of the first connecting element 184 (see FIG. 24).

In this release position of the holding element 212, the two components 102 and 104 can be moved against each other until their contact areas 106 and 108 as well as the bearing surfaces 194 of the connecting elements 184 and 186 fit together in flush manner and the insertible projections 228 of the first connecting element 184 engage in the seating pockets 232 of the second connecting element 186 (see FIG. 25).

Then, the actuating end of a cranked polygonal key 244 is introduced through the access boring 128 in the first component 102 and the passage opening 222 in the housing 188 of the first connecting element 184 into the seating opening 220 of the holding element 212 and brought into engagement with the latter (see FIG. 25).

Subsequently, the holding element 212 is pivoted out from the seating chamber 210 of the first connecting element 184 by means of the polygonal key 242 so that the arc-shaped projections 226 of the holding element 212 enter the receiving chamber 236 of the second connecting element 186 through the mouth 238 and thereby engage behind the restraining projections 240.

The curvature of the arc-shaped projections 226 of the holding element 212 on the one hand and the curvature of the restraining surfaces 242 of the restraining projections 240 are matched to one another in such a way that the two connecting elements 184 and 186 are pulled against each other to an increasing extent in the direction of the connection 196 during the process of pivoting the holding element 212 into the receiving chamber 236 and there results as large a contact area as possible between the restraining surfaces 242 and the arc-shaped projections 226 of the holding element 212.

In consequence, compression stress points in the contact areas between the restraining projections 240 and the arc-shaped projections 226 of the holding element 212 are prevented and the strength of the material from which the holding element 212 and the housing 234 of the second connecting element 186 are made is used as uniformly as possible.

The holding element 212 and the housings 188 and 234 of the respective connecting elements 184 and 186 can therefore be made, in particular, of an injection moulded synthetic material.

When the connection between the connecting elements 184 and 186 is loaded in the direction of connection 196, the holding element 212 experiences substantially only tension and thrust forces, but only to a negligibly small degree, bending moments.

The seating chamber 210 of the first connecting element 184, the receiving chamber 236 of the second connecting element 186 and the outer contours of the connecting elements 184 and 186 are formed in such a way that they can be manufactured in one-piece manner.

The holding element 212 can be pushed into the seating chamber 210 through the mouth of the seating chamber 210 onto the bearing surface 190 of the first connecting element 184 so that the housing 188 of the first connecting element 184 does not need to be separable.

Consequently, one can dispense with constructing the housing 188 of the first connecting element 184 in the form of two half-shells, this thereby increasing the rigidity of the first connecting element 184.

Since the curved bearing surfaces 190 of the connecting elements 184 and 186 have the same radius of curvature as the groove base surfaces 118 of the grooves 110 upon which the bearing surfaces 190 can slide and abut, and since the holding projections 200 of the connecting elements 184 and 186 in the form of an arc of a circle can be displaced tangentially in the respectively associated undercut sections 114 of the grooves 110 using just a small amount of force and hence the connecting elements 184 and 186 still have a certain degree of freedom of movement when establishing the connection, it is still possible to make corrections with respect to the mutual positioning of the connecting elements 184 and 186 during the process of connecting the components 102 and 104.

This significantly reduces the need for precision in regard to the location of the grooves 110 in the components 102 and 104 and thus leads to it being considerably easier for the user to use.

When the holding element 212 is moved from the release position illustrated in FIG. 25 into the holding position illustrated in FIG. 26, then, due to the tensile forces which act on the connecting elements 184 and 186 in the direction of connection 196, such a large amount of static friction will be produced between the supporting surfaces 204 of the holding projections 200 on the one hand and the undercut surfaces 122 of the undercut sections 114 of the grooves 110 which are thereby in contact therewith on the other that the previously described remaining degree of freedom of movement is neutralised and an extremely firm connection between the components 102 and 104 is established.

As a result of the support for the holding projections 200 on the undercut surfaces 122 of the undercut sections 114 of the grooves 110 in the components 102 and 104, the connecting elements 184 and 186 are thus securely anchored in the respectively associated component 102 and 104.

In the holding position illustrated in FIGS. 7 and 26, the holding element 212 in cooperation with the restraining projections 240 prevents a relative movement of the first connecting element 184 and the second connecting element 186 along the direction of the connection 196.

In order to then release the first component 102 and the second component 104 from each other, it is only necessary to again insert a polygonal key 244 through the access boring 128 in the first component 102 so as to engage with the seating opening 220 in the holding element 212 and then to move the holding element 212 by pivoting it in the opposite direction from the holding position into the release position illustrated in FIG. 25 in which the arc-shaped projections 226 of the holding element 212 no longer engage behind the restraining projections 240 of the second connecting element 186 so that the connecting elements 184 and 186 can easily be moved apart along the direction of connection 196.

Figure 28:
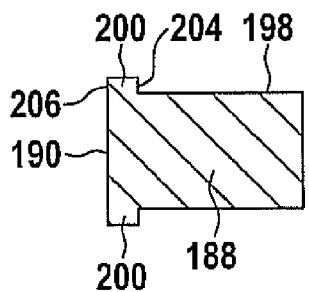
FIG. 28 a schematic section through the housing of the connecting element depicted in FIG. 27, along the line 28-28 in FIG. 27.

As can be seen from FIGS. 27 to 31, the profiles of the holding projections 200 do not by any means always have to be formed such that they are exactly rectangular, as is illustrated in FIG. 28.

Figure 29:
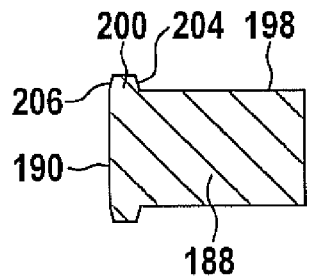
FIGS. 29 to 31 schematic cross sections corresponding to FIG. 28 through the housing of the connecting element depicted in FIG. 27, wherein holding projections of the housing each have different profiles.

Rathermore, provision could also be made for the profile of the holding projections 200 to be trapezoidal, this then tapering with increasing spacing from the side faces 198 of the respective housing 188 and 234, as is illustrated in FIG. 29.

Figure 30:
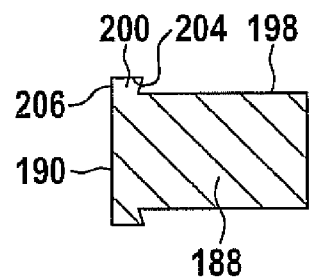

As an alternative thereto, provision may also be made for the profile of the holding projections 200 to taper with decreasing spacing from the respectively associated side face 198, as is illustrated in FIG. 30.

Figure 31:
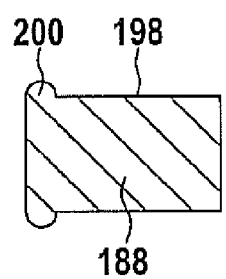
Figure 27:
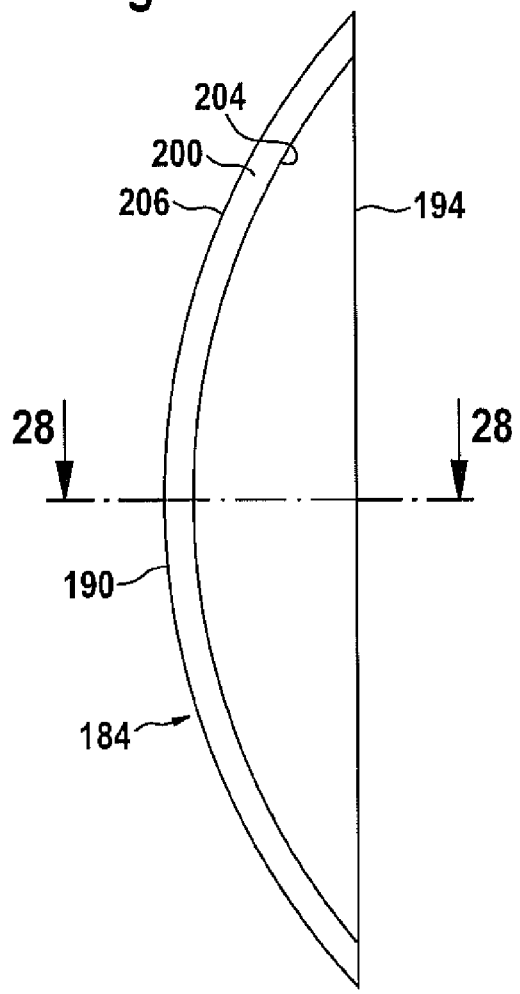
FIG. 27 a schematic side view of a housing of the first connecting element.
Figure 40:
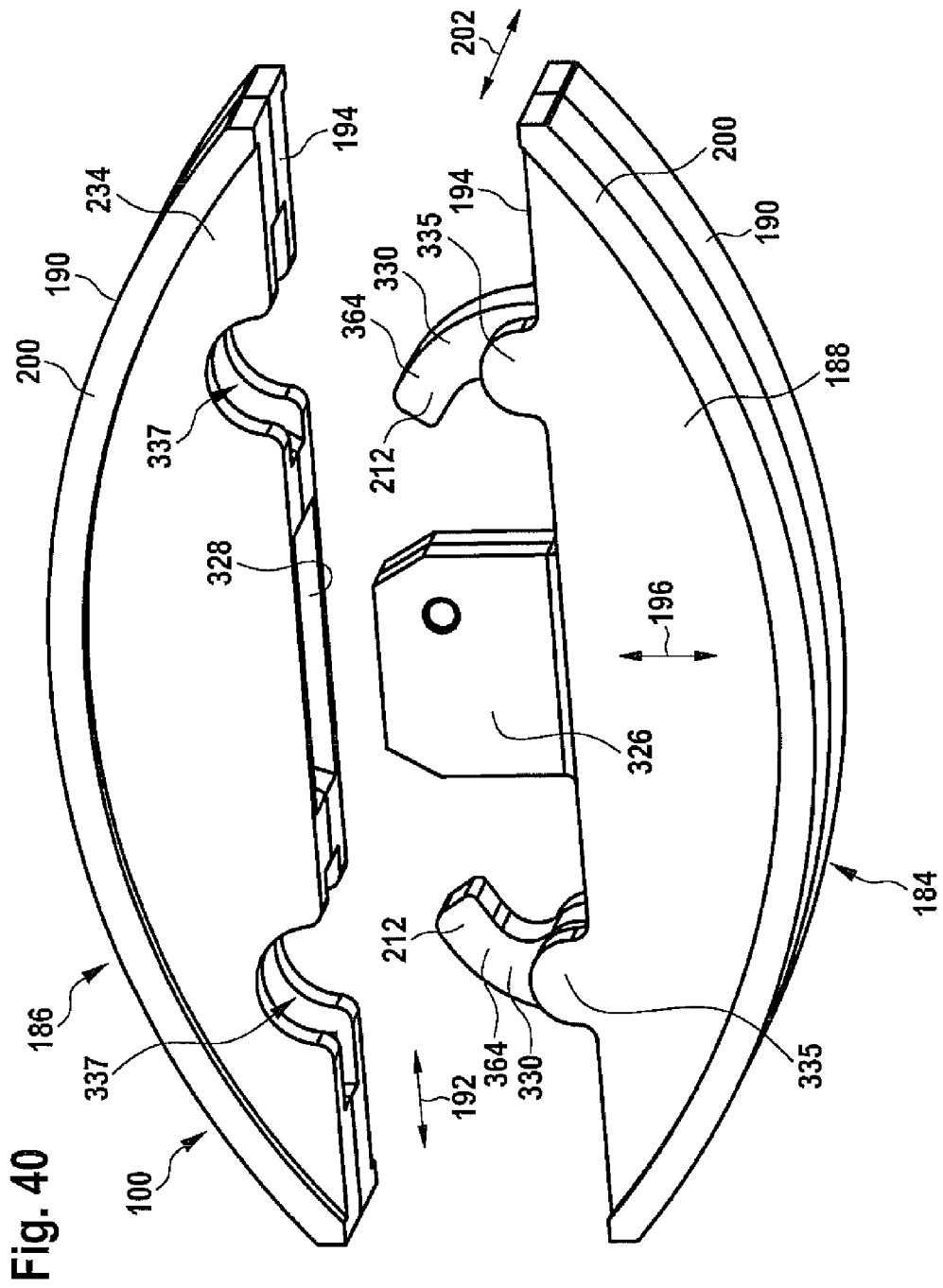
FIG. 40 a schematic perspective illustration of a fourth embodiment of the connecting means in which two pivotal holding elements and a spreading mechanism for separating apart the end regions of the holding elements are provided in the first connecting element.
Figure 41:
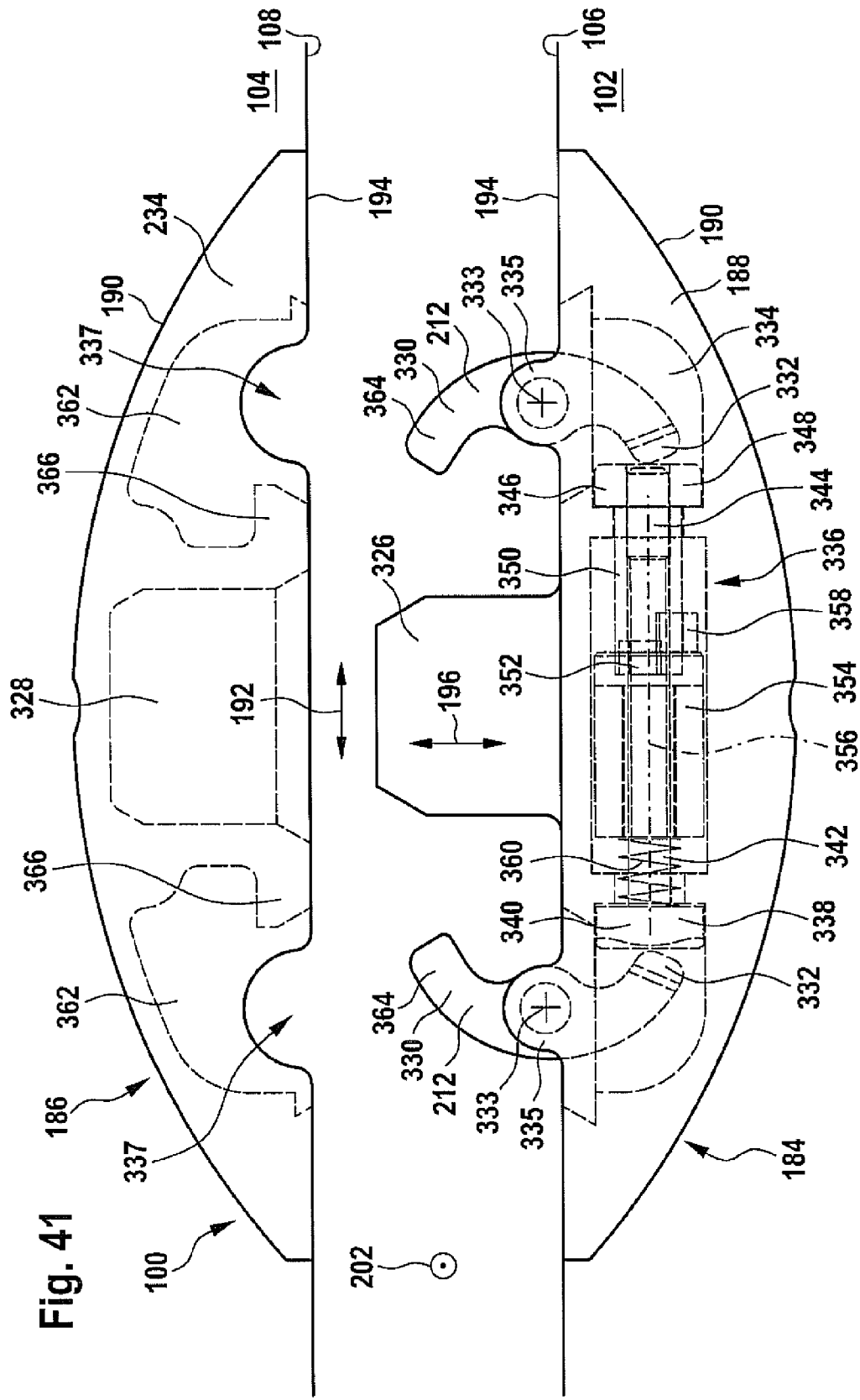
FIG. 41 a schematic side view of the fourth embodiment of the connecting means in the unconnected state of the components.

Furthermore, provision may be made for the profile of the holding projections 200 to have an outer contour which is curved at least in sections thereof, for example a semicircular outer contour, such as is illustrated in FIG. 31.

A second embodiment of a connecting means 100 which is illustrated in FIGS. 32 to 34 differs from the previously described first embodiment in that the holding element 212 in the second embodiment is formed as a threaded element 246 having an external thread 248 which is brought into engagement with an internal thread 250 of a restraining element 252 of the second connecting element 186 for the purposes of connecting the two components 102, 104.

As can best be seen from FIG. 33, the threaded element 246 of the first connecting element 184 comprises outside the external thread 248 a cylindrical head part 254 having a central seating 256 for an actuating section of a (not illustrated) actuating element such as a polygonal key or a screwdriver for example, wherein the seating 256 has a polygonal cross section complementary to the cross section of the actuating section.

Between the head part 254 and the external thread 248 of the threaded element 246, there is arranged a cylindrical shank part 258 which has a smaller diameter than the head part 254.

The head part 254 and the shank part 258 are arranged in a stepped seating chamber 260 of the housing 188 of the first connecting element 184 which has a lower chamber section 262 of greater diameter and an upper chamber section 264 of lesser diameter, wherein the two chamber sections 262, 264 merge into one another at a shoulder 266 on which the head part 254 of the threaded element 246 is supported.

The upper chamber section 264 extends upwardly along the direction of connection 196 and opens out into the bearing surface 194 of the first connecting element 184.

The threaded element 246 serving as a holding element 212 is thus arranged on the first connecting element 184 such that it is rotatable about an axis of rotation 268 that is oriented parallel to the direction of connection 196.

The restraining element 252 of the second connecting element 186 has a parallelepipedal outer contour and is held such that it is displaceable in the longitudinal direction 192 in non rotatable manner in a likewise parallelepipedal seating chamber 270 in the housing 234 of the second connecting element 186.

The seating chamber 270 is pierced by an access channel 272 which extends along the direction of the connection 196 from the bearing surface 194 of the second connecting element 186 through the seating chamber 270 up to the curved bearing surface 190 of the second connecting element 186 and it has an elongate and in particular, oval cross section.

For the purposes of establishing the connection between the first component 102 and the second component 104, the first connecting element 184 and the second connecting element 186 of the second embodiment of the connecting means 100 are inserted into the respective grooves 110 of the first component 102 and the second component 104.

Then, the second component 104 with the second connecting element 186 is placed on the first component 102 with the first connecting element 184 in such a way that the external thread 248 of the threaded element 246 extends through the access channel 272 of the second connecting element 186 into the seating chamber 250 and comes into engagement with the internal thread 270 of the restraining element 252.

Subsequently, the threaded element 246 is set into rotation about the rotational axis 268 by means of the (not illustrated) actuating element (a screwdriver for example) which engages in the seating 256 in the head part 254 of the threaded element 246 through an access boring in the first component 102 so that the external thread 248 of the threaded element 246 is screwed into the internal thread 250 of the restraining element 252 and hence the second connecting element 186 is pulled against the first connecting element 184 until the state illustrated in FIG. 34 is reached, in which the bearing surfaces 194 of the two connecting elements 184, 186 fit flushly together and the external thread 248 extends beyond the seating chamber 270 into the section of the access channel 272 lying between the seating chamber 270 and the bearing surface 190 of the second connecting element 186.

In order to enable the actuating element to engage in the seating 256 in the head part 254 of the threaded element 246, the access boring in the first component 102 in the case of this embodiment is aligned coaxially with respect to the axis of rotation 268 of the threaded element 246 and thus parallel to the direction of the connection 196.

In this embodiment, the separation of the two components 102 and 104 from each other is effected in that the external thread 248 is unscrewed from the internal thread 250 of the restraining element 252 by rotating the threaded element 246 in the opposite direction by means of the (not illustrated) actuating element until the threaded element 246 is no longer in engagement with the restraining element 252 and the second connecting element 186 can thus be removed from the first connecting element 184.

Due to the displaceability of the restraining element 252 in the longitudinal direction 192 and as a result of the elongate cross section of the access channel 272, it is possible to have a certain amount of relative movement between the threaded element 246 and the housing 234 of the second connecting element 186 when establishing the connection between the first component 102 and the second component 104 so that tolerances in the positioning of the grooves 110 in the components 102, 104 can thereby be compensated for.

The second embodiment of the connecting means 100 illustrated in FIGS. 32 to 34 does not comprise insertible projections on the first connecting element 184, but, in like manner to the first embodiment, it does comprise holding projections 200 on the connecting elements 184 and 186.

In all other respects, the second embodiment of the connecting means 100 illustrated in FIGS. 32 to 34 coincides in regards to the construction and manner of functioning thereof with the first embodiment illustrated in FIGS. 1 to 31, so that to this extent reference is made to the previous description thereof.

A third embodiment of the connecting means 100 illustrated in FIGS. 35 to 39 differs from the previously described first embodiment in that the housing 188 of the first connecting element 184 comprises a hump-like elevated portion 274 between the two insertible projections 228, said elevated portion engaging in a complementarily shaped depression 276 in the housing 234 of the second connecting element 186 in the connected state of the components 102, 104 (see FIG. 37).

A certain amount of play is present in the longitudinal direction 192 between the elevated portion 274 and the depression 276 so that tolerances in the positioning between the grooves 110 and the components 102, 104 can be compensated for.

In this embodiment, the holding element 212 of the first connecting element 184 is formed as a threaded element 278 which comprises a hollow cylindrical socket section 280 having an internal thread 282 and a shaft section 284 that extends downwardly from the socket section 280 along the direction of connection 196 and has a smaller diameter than the socket section 280 as well as a driven element 286 which projects downwardly from the periphery of the socket section 280 in the axial direction (see in particular, FIG. 38).

As can best be seen from FIG. 36, the threaded element 278 is arranged in a stepped seating chamber 288 of the housing 188 of the first connecting element 184, said chamber comprising a lower chamber section 290 of greater diameter and an upper chamber section 292 of lesser diameter wherein these chambers merge into one another at a shoulder 294.

The threaded element 278 is arranged in the seating chamber 288 such as to be rotatable about an axis of rotation 296 oriented parallel to the direction of connection 196.

Furthermore, in order to be able to produce a rotational movement of the threaded element 278 about the axis of rotation 296, there is provided in the lower chamber section 290 of the seating chamber 288 a hollow cylindrical magnet element 298 which is aligned coaxially with respect to the threaded element 278 and is pushed partially onto the shaft section 284 of the threaded element 278 and it is provided at the end face thereof facing the socket section 280 with an axially projecting driver element 300 (see in particular, FIG. 38).

The magnet element 298 consists of a permanent magnet material which is magnetized substantially perpendicularly to its longitudinal axis and thus perpendicularly to the axis of rotation 296 (so-called diametrical magnetization).

The diametrically magnetized magnet element 298, which is mounted on the shaft section 284 of the threaded element 278 such as to be rotatable about the axis of rotation 268, can be caused to make an oscillatory rotational movement about the axis of rotation 296 by means of a time varying external magnetic drive field that acts on the magnet element 298 from outside the connecting means 100, said movement producing a directed rotational movement of the threaded element 278 about the axis of rotation 296 due to the interaction between the driver element 300 of the magnet element 298 and the driven element 286 of the threaded element 278.

For this purpose, there is used a drive unit 302 which is schematically illustrated in FIGS. 38 and 39, said drive unit comprising a housing 304, which consists of a synthetic material for example, an electric motor 306 having a drive shaft 308 arranged in the housing 304, and a drive magnet 310 connected in mutually non-rotatable manner to the drive shaft 308.

The drive magnet 310 is formed as a cylindrical high power permanent magnet which is magnetized substantially perpendicularly to the longitudinal direction 312 of the drive shaft 308 (so-called diametrical magnetization).

For the purposes of establishing a rotational movement of the threaded element 278, one now proceeds as follows:

The drive unit 302 is moved relative to the first connecting element 184 into a position in which the longitudinal direction 312 of the drive shaft 308 of the drive unit 302 and the axis of rotation 296 of the threaded element 278 are oriented parallel to each other and the spacing between the drive magnet 310 and the magnet element 298 is as small as possible in order to obtain as strong a mutual interaction of the magnets as possible. The location of the drive unit 302 and that of the magnet element 298 in this position are schematically illustrated in FIGS. 38 and 39.

If the electric motor 306 of the drive unit 302 is now operated in such a way that the drive shaft 308 and thus the drive magnet 310 rotate in the clockwise direction for example (when viewed along a line of sight indicated by the arrow 39 in FIG. 38), then the north pole (N) and the south pole (S) of the drive magnet 310 thereby rotate in the clockwise direction due to the diametrical magnetization of the drive magnet 310, as is to be seen in the schematic illustration of FIG. 39.

The rotational movement of the drive magnet 310 thus produces a rotating and hence time varying magnetic drive field.

In order to enable this magnetic drive field to penetrate into the interior of the first connecting element 184 and interact with the magnet element 298, the housing 188 of the first connecting element 184 consists of a non-ferromagnetic material, for example, it consists of a synthetic material.

Since unlike poles of the magnet element 298 and the drive magnet 310 attract one another and like poles of these elements repel each other, the magnet element 298 in the seating chamber 288 rotates in the opposite direction of rotation due to the interaction with the drive magnet 310, i.e. in the counter clockwise direction (in the line of sight indicated by the arrow 39 in FIG. 38).

Due to this rotational movement, the driver element 300 of the magnet element 298 comes into contact with the driven element 286 of the threaded element 278 so that the threaded element 278 is forced by the magnet element 298 into making a rotational movement about the axis of rotation 296 in the same direction of rotation as that of the magnet element 298.

The magnet element 298 and the threaded element 278 carried along thereby follow the rotational movement of the drive magnet 310 until such time as the resistance acting on the threaded element 278 (which, for example, is exerted due to the fact that the internal thread 282 of the threaded element 278 is rotated on a complementary external thread 314 of a restraining element 316 provided on the second connecting element 186) becomes so large that the torque being transferred by the rotary magnetic field produced by the drive magnet 310 is no longer sufficient to continue to rotate the threaded element 278. When such a blockage point is reached, the threaded element 278 and the magnet element 298 then remain in the position they have reached, whilst the drive magnet 310 continues to rotate.

After the drive magnet 310 has continued to rotate through approximately 180° so that the like poles of the drive magnet 310 and the magnet element 298 are then located directly opposite each other, the magnet element 298 is again caused to move in a flip-over process, namely, in a direction of rotation having the same sense as the direction of rotation of the drive magnet 310 until the unlike poles of the drive magnet 310 and the magnet element 298 are located directly opposite each other once again.

Once this state is reached, the direction of rotation of the magnet element 298 then reverses again, and the magnet element 298 again rotates in the opposite sense to the drive magnet 310, as occurred in the phase prior to the blockage of the threaded element 278.

The magnet element 298 is now accelerated through approximately half a revolution by the rotating magnetic field of the drive magnet 310 until the driver element 300 again strikes the driven element 286 of the threaded element 278 and the impulse of the magnet element 298 is suddenly transferred to the driven element 286 and thus to the threaded element 278. Due to this large impulse transmission, the threaded element 278 can release itself from its blockage position and continue to rotate through a certain angle into a position in which a renewed blockage of the threaded element 278 occurs. The magnet element 298 thus stops again in this new blockage position without being able to follow the drive magnet 310 any further until the like poles of the magnet element 298 and the drive magnet 310 are located directly opposite each other again and a renewed flip-over process of the magnet element 298 enables renewed reception of an impulse to occur.

The threaded element 278 continues to rotate from blockage position to blockage position in this periodically repeating manner. The repeated receipt of momentum and striking of the driver element 300 against the driven element 286 produce an impact hammer action which powerfully accelerates the rotational movement of the threaded element 278 about the axis of rotation 296 against a resistance.

Further details for the process of creating a rotational movement of the threaded element 278 by means of an external drive magnet 310 can be derived from DE 198 07 663 A1 to which reference in this connection is made and which is hereby incorporated as a component part of the present description.

Due to the rotational movement of the threaded element 278 that is produced in such a manner, the internal thread 282 of the threaded element 278 can be screwed to the external thread 314 of the restraining element 316 provided on the second connecting element 186 or it can be released from the external thread 314 (upon reversal of the direction of rotation of the drive magnet 310).

In this embodiment, the restraining element 316 comprises a square head 318 which is fed with a certain amount of play into a parallelepipedal seating chamber 320 within the housing 234 of the second connecting element 186 and thus prevented from rotating about the direction of the connection 196.

From the lower surface of the square head 318, the external thread 314 of the restraining element 316 extends through an access channel 322 running parallel to the direction of the connection 196 into the depression 276 of the second connecting element 186 so that this external thread 314 is then located opposite the internal thread 282 of the threaded element 278 on the first connecting element 184 (see FIGS. 35 and 36).

Furthermore, as can be seen from FIG. 37, there is provided in the seating chamber 320 a compression spring 324 which biases the restraining element 316 against the first connecting element 184 in the direction of connection 196.

For the purposes of establishing the connection between the first component 102 and the second component 104 by means of the third embodiment of the connecting means 100, one proceeds as follows:

After the first connecting element 184 and the second connecting element 186 have been inserted into the respective grooves 110 of the first component 102 and the second component 104, the second component 104 with the second connecting element 186 is moved against the first component 102 with the first connecting element 184 in such a way that the internal thread 282 of the threaded element 278 comes into engagement with the external thread 314 of the restraining element 316.

The insertible projections 228 also penetrate the seating pockets 232 of the second connecting element 186 that are complementary thereto and the hump-like raised portion 274 of the first connecting element 184 enters the depression 276 in the second connecting element 186 that is complementary thereto.

Subsequently, in the manner already described hereinabove, the threaded element 278 is caused to effect a rotational movement about the axis of rotation 296 by means of the drive unit 302 in such a manner that the socket section 280 of the threaded element 278 having the internal thread 282 and the restraining element 316 having the external thread 314 are screwed together so that the second connecting element 186 is pulled against the first connecting element 184 and the connection between the components 102 and 104 is established.

For the purposes of releasing the connection between the components 102 and 104, the screwed connection between the threaded element 278 and the restraining element 316 is undone by using the drive unit 302 with the opposite direction of rotation of the drive magnet 310.

In all other respects, the third embodiment of the connecting means 100 illustrated in FIGS. 35 to 39 coincides in regards to the construction and manner of functioning thereof with the first embodiment illustrated in FIGS. 1 to 31, so that to this extent reference is made to the previous description thereof.

A fourth embodiment of the connecting means 100 illustrated in FIGS. 40 to 45 differs from the embodiment illustrated in FIGS. 1 to 31 in that instead of having two insertible projections 228 on the first connecting element 184, there is provided just a single central insertible projection 326 which engages in a seating pocket 328 of the second connecting element 186 that is complementary thereto in the connected state of the components 102, 104.

Furthermore, in this embodiment, the first connecting element 184 does not comprise just a single holding element 212, but rather, it comprise two holding elements 212 which are held such as to be pivotal on the housing 188 of the first connecting element 184, these holding elements being in the form of hinged levers 330 of which one is arranged on each side of the central insertible projection 326.

The inner end regions 332 of the hinged levers 330 which are mounted on bearing projections 335 such as to be pivotal about pivotal axes 333 engage in a seating chamber 334 within the housing 188 and are held at a distance from one another by means of a spreading mechanism 336.

The spreading mechanism 336 itself comprises a first spreading element 338 having a square head 340, a shank section 342 which extends from the square head 340 in the longitudinal direction 192 and a threaded section 344 having an external thread which adjoins the shank section 342.

Furthermore, the spreading mechanism 336 comprises a second spreading element 346 having a cylindrical head section 348 and a hollow cylindrical socket section 350 which is provided with an internal thread and extends from the head section 348 in the longitudinal direction 192 such as to be coaxial with the shank section 342 of the first spreading element 338.

The internal thread of the socket section 350 of the second spreading element 346 is now in engagement with the external thread of the threaded section 344 of the first spreading element 338.

Furthermore, the socket section 350 is provided at the end thereof facing the square head 340 of the first spreading element 338 with a driven element 352 which projects in the radial direction.

Between the square head 340 of the first spreading element 338 and the socket section 350 of the second spreading element 346, there is a hollow cylindrical magnet element 354 having diametrical magnetization which is arranged on the shank section 342 of the first spreading element 338 such as to be rotatable about the common longitudinal axis 356 of the two spreading elements 338 and 346.

At the end face thereof facing the socket section 350 of the second spreading element 346, the magnet element 354 is provided with a driver element 358 which projects in the axial direction and which can act on the driven element 352 on the socket section 350.

Between the square head 340 of the first spreading element 338 and the end face of the magnet element 354 facing said square head, there is arranged a compression spring 360 which biases the magnet element 354 against the socket section 350 of the second spreading element 346.

As can best be seen from FIGS. 44 and 45, the second spreading element 346 of the spreading mechanism 336 is adapted to be driven in like manner to the threaded element 278 of the previously described third embodiment of the connecting means 100, by means of a drive unit 302 incorporating a rotary drive magnet 310 which interacts with the magnet element 354, such as to execute a rotational movement about the longitudinal axis 356 relative to the first spreading element 338 which is held in a constant rotational position by its square head 340.

To this end as illustrated in FIGS. 44 and 45, the drive unit 302 is oriented outside the connecting means 100 in such a way that the longitudinal direction 312 of the drive shaft 308 is oriented substantially parallel to the longitudinal axis 356 of the spreading elements 338, 346 and the spacing between the drive magnet 310 and the magnet element 354 is made as small as possible.

In the housing 234 of the second connecting element 186, there are provided two receiving chambers 362 into which the outer end regions 364 of the hinged lever 330 can enter when the bearing surfaces 194 of the connecting elements 184 and 186 abut one another.

Furthermore, recesses 337 for seating the bearing projections 335 protruding from the housing 188 are provided in the housing 234.

Figure 42:
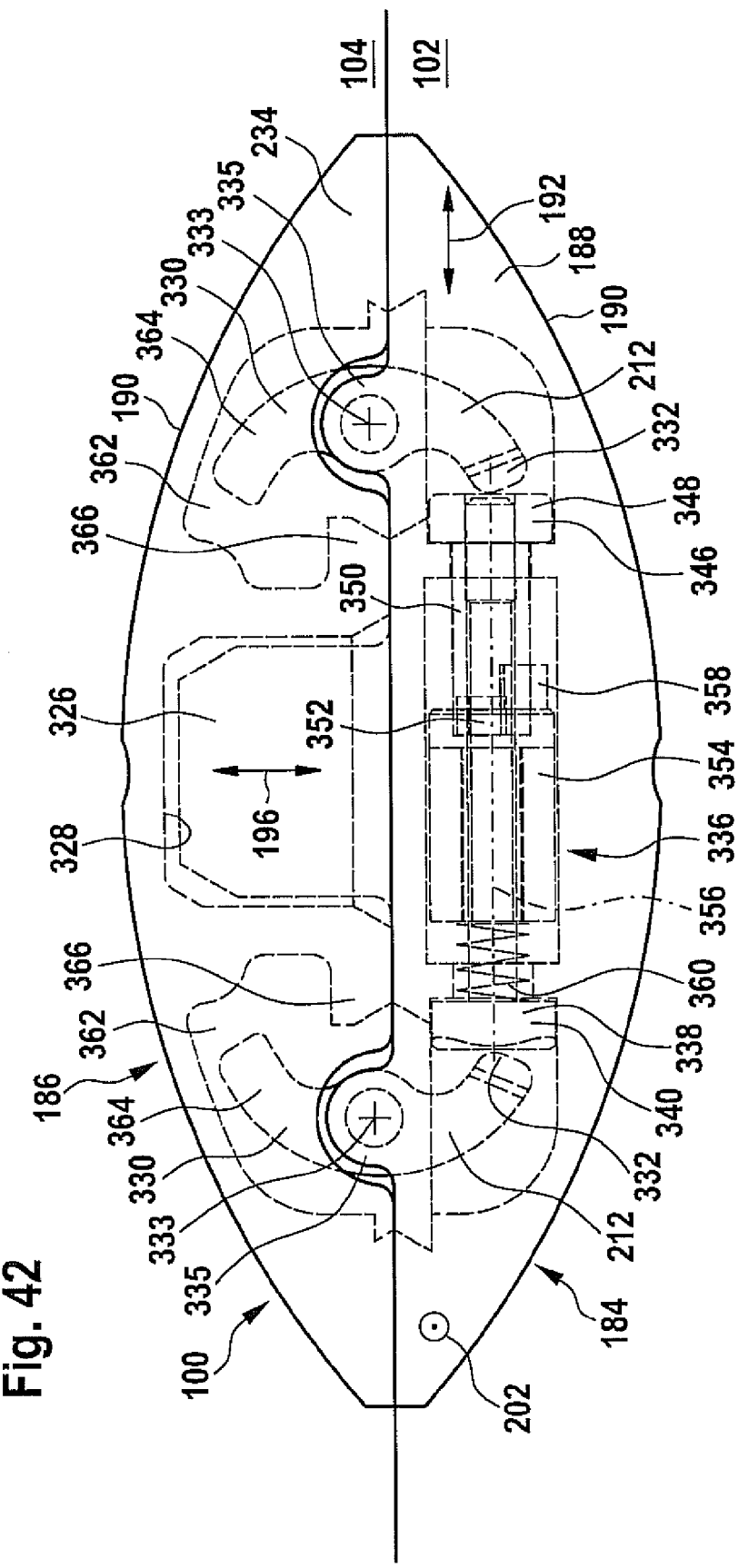
FIG. 42 a schematic side view corresponding to FIG. 41 wherein the components that are to be connected together are located against one another and the holding elements are in their release position.
Figure 43:
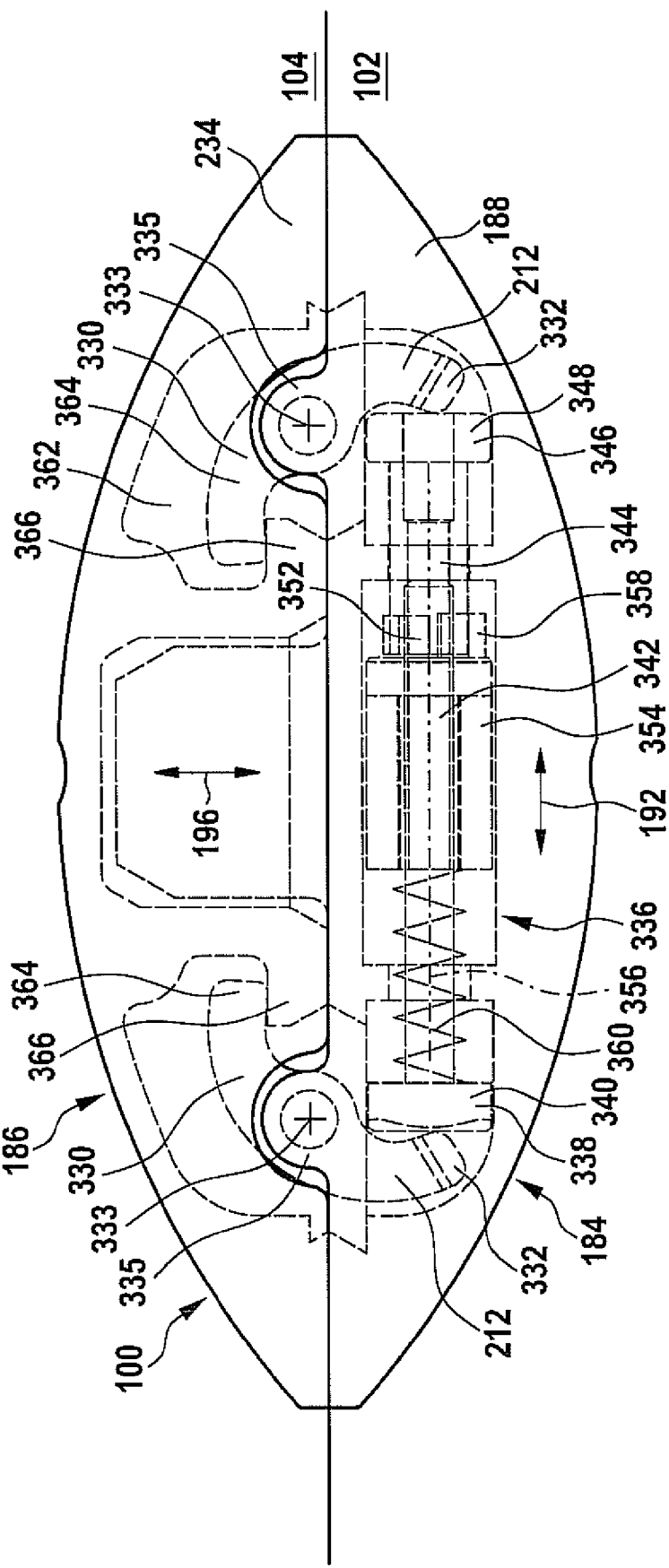
FIG. 43 a schematic side view of the fourth embodiment of the connecting means corresponding to FIG. 42 wherein the holding elements are in the holding position.

At the edges thereof facing the first connecting element 184, the receiving chambers 362 are bounded in sectional manner by a respective restraining projection 366 which can be engaged behind by the respectively associated hinged lever 330 when the hinged lever 330 concerned is pivoted about its pivotal axis 333 from the release position illustrated in FIG. 42 into the holding position illustrated in FIG. 43.

Such a pivotal action can be effected by means of the previously described spreading mechanism 336.

In this embodiment, the respective housings 188 and 234 of the first connecting element 184 and the second connecting element 186 are preferably formed in two-piece manner, whereby the two parts fit together along the longitudinal centre plane of the respective housing.

For the purposes of establishing a connection between the first component 102 and the second component 104 by means of the fourth embodiment of the connecting means 100, one proceeds as follows:

The first connecting element 184 and the second connecting element 186 are inserted into the respective groove 110 in the first component 102 and in the second component 104.

Thereafter, the second component 104 with the second connecting element 186 is placed on the first component 102 with the first connecting element 184 in such a way that the outer end regions 364 of the hinged lever 330 which is located in the release position enter into the receiving chambers 362 of the second connecting element 186 and the central insertible projection 326 of the first connecting element 184 enters into the seating pocket 328 of the second connecting element 186.

Subsequently, the second spreading element 346 is caused to effect a rotational movement about the longitudinal axis 356 by means of the drive unit 302 in such a manner that the head section 348 of the second spreading element 346 is removed from the square head 340 of the first spreading element 338 and hence the overall length of the spreading mechanism 336 increases, whereby the inner end regions 332 of the hinged lever 330 are moved away from each other, the hinged levers 330 are pivoted about their pivotal axes 333 and are thereby moved into the holding position illustrated in FIG. 43 in which the outer end regions 364 of the hinged lever 330 engage behind the respectively associated restraining projections 366 of the second connecting element 186 and abut said projections so that the second connecting element 186 is locked onto the first connecting element 184 and the connecting elements 184, 186 can no longer be moved apart along the direction of connection 196.

In order to release the connection of the components 102, 104, the second spreading element 346 is rotated relative to the first spreading element 338 about the longitudinal axis 356 by means of the drive unit 302 in the reverse direction of rotation so that the head section 348 of the second spreading element 346 is moved towards the square head 340 of the first spreading element 338 and the overall length of the spreading mechanism 336 shortens.

The inner end regions 332 of the hinged lever 330 thereupon no longer lie on the square head 340 of the first spreading element 338 or on the head section 348 of the second spreading element 346 so that the spreading mechanism 336 no longer presents any resistance to a pivotal movement of the hinged levers 330 from the holding position illustrated in FIG. 43 into the release position illustrated in FIG. 42.

After this process of unlocking the hinged levers 330, the second connecting element 186 can then be removed from the first connecting element 184 along the direction of connection 196.

In all other respects, the fourth embodiment of the connecting means 100 illustrated in FIGS. 40 to 45 coincides in regards to the construction and manner of functioning thereof with the first embodiment illustrated in FIGS. 1 to 31, so that to this extent reference is made to the previous description thereof.

A fifth embodiment of the connecting means 100 which is illustrated in FIGS. 46 to 48 differs from the first embodiment which is illustrated in FIGS. 1 to 31 in that no pivotal holding element is provided and in that, instead of having the two insertible projections 228 on the first connecting element 184, there is provided just a single central insertible projection 378 which is in the form of a substantially parallelepipedal block dowel 380 and projects upwardly from the bearing surface 194. In the connected state of the components 102, 104, the insertible projection 378 enters a complementary, substantially parallelepipedal seating pocket 382 which is formed in the housing 234 of the second connecting element 186.

For the purposes of establishing a connection between the components 102 and 104 by means of the fifth embodiment of the connecting means 100, one proceeds as follows.

The first connecting element 184 and the second connecting element 186 are inserted into the respective groove in the respective first component 102 and second component 104.

Subsequently, the bearing surface 194 and the insertible projection 378 of the first connecting element 184 and/or the bearing surface 194 and the boundary surfaces of the seating pocket 382 of the second connecting element 186 are provided with a suitable adhesive.

Thereafter, the second component 104 with the second connecting element 186 is moved against the first component 102 with the first connecting element 184 in such a way that the insertible projection 378 of the first connecting element 184 enters the seating pocket 382 of the second connecting element 186 and the bearing surfaces 194 of the two connecting elements 184, 186 abut.

The two components 102, 104 are held in this position until the adhesive has hardened and hence an integral bond has been established between the first connecting element 184 and the second connecting element 186 and thus between the first component 102 and the second component 104.

In all other respects, the fifth embodiment of the connecting means 100 illustrated in FIGS. 46 to 48 coincides in regards to the construction and manner of functioning thereof with the first embodiment illustrated in FIGS. 1 to 31, so that to this extent reference is made to the previous description thereof.

The invention claimed is:

1. A groove milling device for milling a groove in a component,
    comprising a milling disk which is rotatable about a rotational axis, wherein the groove milling device comprises a displacement device for moving the milling disk along the rotational axis during the milling process and
    wherein the groove milling device comprises a control device which actuates the displacement device automatically when a predetermined depth of the milled groove is reached during the milling process.

2. A groove milling device in accordance with claim 1, wherein the groove milling device comprises a stop means for limiting the depth of the milled groove.

3. A groove milling device in accordance with claim 1, wherein the groove milling device comprises a switch for activating the displacement device by an operator during the milling process.

4. A groove milling device in accordance with claim 1, wherein the milling disk is movable along the rotational axis by means of the displacement device from a basic position into a first undercut position and afterwards, in the opposite direction, into a second undercut position which is beyond the basic position.

5. A groove milling device in accordance with claim 1, wherein the length of the path through which the milling disk is movable along the rotational axis by means of the displacement device is adjustable to different values.

6. A groove milling device in accordance with claim 1, wherein the energy required for actuating the displacement device can be generated by means of a generator coupled to a main drive spindle of the groove milling device.

7. A groove milling device in accordance with claim 6, wherein the generator is in the form of an eddy-current coupling.

8. A groove milling device in accordance with claim 1, wherein the milling disk comprises radially projecting milling teeth around its periphery and annular groove teeth which project in an axial direction of the milling disk.

9. A groove milling device for milling a groove in a component,
    comprising a milling disk which is rotatable about a rotational axis, wherein the groove milling device comprises a displacement device for moving the milling disk along the rotational axis during the milling process and
    wherein the groove milling device comprises a switch for activating the displacement device by an operator during the milling process.

10. A groove milling device for milling a groove in a component,
    comprising a milling disk which is rotatable about a rotational axis, wherein the groove milling device comprises a displacement device for moving the milling disk along the rotational axis during the milling process and
    wherein the energy required for actuating the displacement device can be generated by a generator coupled to a main drive spindle of the groove milling device.

11. A groove milling device in accordance with claim 10, wherein the generator is in the form of an eddy-current coupling.

* * * * *